(12) United States Patent
Aiba et al.

(10) Patent No.: US 11,160,087 B2
(45) Date of Patent: Oct. 26, 2021

(54) TERMINAL DEVICE, BASE STATION DEVICE, COMMUNICATION METHOD, AND INTEGRATED CIRCUIT

(71) Applicant: Sharp Kabushiki Kaisha, Sakai (JP)

(72) Inventors: Tatsushi Aiba, Sakai (JP); Shoichi Suzuki, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/759,239

(22) PCT Filed: Sep. 2, 2016

(86) PCT No.: PCT/JP2016/075810
§ 371 (c)(1),
(2) Date: Mar. 12, 2018

(87) PCT Pub. No.: WO2017/047409
PCT Pub. Date: Mar. 23, 2017

(65) Prior Publication Data
US 2018/0242326 A1    Aug. 23, 2018

(30) Foreign Application Priority Data
Sep. 18, 2015    (JP) .............................. JP2015-185161

(51) Int. Cl.
*H04W 72/04* (2009.01)
*H04W 28/06* (2009.01)
(Continued)

(52) U.S. Cl.
CPC ....... *H04W 72/0493* (2013.01); *H04W 28/06* (2013.01); *H04W 72/12* (2013.01);
(Continued)

(58) Field of Classification Search
CPC ..... H04W 28/06; H04W 72/12; H04W 72/14; H04W 72/0493; H04W 72/1284; H04W 76/11
See application file for complete search history.

(56) References Cited

U.S. PATENT DOCUMENTS

| 2014/0056243 A1* | 2/2014 | Pelletier ............ H04W 72/1268 370/329 |
| 2015/0230267 A1* | 8/2015 | Lee ................... H04W 72/1284 370/336 |
| 2018/0167842 A1* | 6/2018 | Bergstrom ............ H04W 28/10 |

OTHER PUBLICATIONS

Samsung, "Skipping uplink transmission on configured uplink grant with no data to transmit", 3GPP TSG-RAN WG2 Meeting #91bis, R2-154351, Sep. 5-9, 2015, 3 pages.

(Continued)

*Primary Examiner* — Jianye Wu
(74) *Attorney, Agent, or Firm* — Keating & Bennett, LLP

(57) ABSTRACT

Uplink data is transmitted efficiently. A terminal device includes: a reception unit configured to receive a parameter included in an RRC message and receive downlink control information, by using a physical downlink control channel; and a higher layer processing unit configured to store an uplink grant as a configured uplink grant. The configured uplink grant is delivered to a HARQ entity in a case that the parameter is configured and a Semi-Persistent Scheduling release is indicated by using the downlink control information, and the configured uplink grant is cleared in a case that the parameter is not configured and the Semi-Persistent Scheduling release is indicated by using the downlink control information.

4 Claims, 13 Drawing Sheets

(51) Int. Cl.
H04W 72/12 (2009.01)
H04W 72/14 (2009.01)
H04W 76/11 (2018.01)

(52) U.S. Cl.
CPC ....... *H04W 72/1284* (2013.01); *H04W 72/14* (2013.01); *H04W 76/11* (2018.02)

(56) References Cited

OTHER PUBLICATIONS

Ericsson, "L2 enhancements to reduce latency", 3GPP TSG-RAN WG2 #91, Tdoc R2-153490, Aug. 24-28, 2015, pp. 1-7.
"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.6.0, Jun. 2015, pp. 1-77.
Samsung; "Skipping Uplink Transmission with no Data to Transmit"; 3GPP TSG-RAN WG2; Meeting #91; R2-153332; Aug. 24-28, 2015; pp. 1-2.
Nokia Networks; "Potential Protocol Enhancement for Fast Uplink Access"; 3GPP TSG-RAN WG2; Meeting #91; R2-153222; May 24-28, 2015; 3 pages.
Huawei, et al.; "Uplink Latency Reduction for Synchronized UEs"; 3GPP TSG-RAN WG2 Meeting #91; R2-153374; Aug. 24-28, 2015; 5 pages.

* cited by examiner

Special fields for Semi-Persistent Scheduling Activation PDCCH/EPDCCH Validation

| | DCI format 0 | DCI format 1/1A |
|---|---|---|
| TPC command for scheduled PUSCH | set to '00' | N/A |
| Cyclic shit DMRS | Set to '000' | N/A |
| Modulation and coding scheme and redundancy version | MSB is set to '0' | N/A |
| HARQ process number | N/A | FDD: set to '000' TDD: set to '0000' |
| Modulation and coding scheme | N/A | MSB is set to '0' |
| Redundancy version | N/A | set to '00' |

FIG. 3

Special fields for Semi-Persistent Scheduling Release PDCCH/EPDCCH Validation

| | DCI format 0 | DCI format 1/1A |
|---|---|---|
| TPC command for scheduled PUSCH | set to '00' | N/A |
| Cyclic shift DMRS | Set to '000' | N/A |
| Modulation and coding scheme and redundancy version | set to '11111' | N/A |
| Resource block assignment and hopping resource allocation | set to all '1's | N/A |
| HARQ process number | N/A | FDD: set to '000'<br>TDD: set to '0000' |
| Modulation and coding scheme | N/A | set to '11111' |
| Redundancy version | N/A | set to '00' |
| Resource block assignment | N/A | set to all '1's |

FIG. 4

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

This application claims priority based on JP 2015-185161 filed on Sep. 18, 2015, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied (NPL 1). In LTE, a base station device is also referred to as an evolved NodeB (eNodeB), and a terminal device is also referred to as User Equipment (UE). LTE is a cellular communication system in which multiple areas each covered by the base station device are deployed to form a cellular structure. In such a cellular communication system, a single base station device may manage multiple cells.

LTE supports a Time Division Duplex (TDD). LTE that employs the TDD scheme is also referred to as TD-LTE or LTE TDD. In TDD, uplink signals and downlink signals are time division multiplexed. Furthermore, LTE supports a Frequency Division Duplex (FDD).

In 3GPP, latency reduction enhancements have been studied. For example, for the latency reduction enhancements, Scheduling request first grant or Pre-scheduled first grant has been studied (NPL 2).

CITATION LIST

Non Patent Literature

NPL 1: "3GPP TS 36.321 V12.6.0 (2015-06) Evolved Universal Terrestrial Radio Access (E-UTRA); Medium Access Control (MAC) protocol specification (Release 12)", Jul. 8, 2015.

NPL 2: "L2 enhancements to reduce latency", R2-153490, Ericsson, 3GPP TSG-RAN WG2 #91, Beijing, China, 24-28 Aug. 2015.

SUMMARY OF INVENTION

Technical Problem

However, for the radio communication system as described above, a concrete procedure when transmitting uplink data has not been sufficiently studied.

The present invention has been made in light of the foregoing, and an object of the present invention is to provide a terminal device, a base station device, a communication method, and an integrated circuit, which enable efficient transmission of uplink data.

Solution to Problem (1) To accomplish the object described above, aspects of the present invention are contrived to provide the following measures. Specifically, a terminal device according to an aspect of the present invention includes: a reception unit configured to: receive, from a base station device, a parameter included in an RRC message and receive downlink control information from the base station device by using a physical downlink control channel; and a higher layer processing unit configured to store an uplink grant received from the base station device, as a configured uplink grant. The higher layer processing unit is configured to: deliver the configured uplink grant to a HARQ entity in a case that the parameter is configured and a Semi-Persistent Scheduling release is indicated by using the downlink control information; and clear the configured uplink grant in a case that the parameter is not configured and the Semi-Persistent Scheduling release is indicated by using the downlink control information.

(2) In the case that the parameter is configured and the Semi-Persistent Scheduling release is indicated by using the downlink control information, the configured uplink grant is cleared after an uplink transmission. The uplink transmission includes at least one prescribed MAC control element.

(3) A base station device according to an aspect of the present invention includes: a transmission unit configured to: transmit, to a terminal device, a parameter included in an RRC message; and transmit downlink control information to the terminal device by using a physical downlink control channel; and a higher layer processing unit configured to store an uplink grant transmitted to the terminal device, as a configured uplink grant. The configured uplink grant is cleared after an uplink reception in a case that the parameter is configured and a Semi-Persistent Scheduling release is indicated by using the downlink control information. The configured uplink grant is cleared in a case that the parameter is not configured and the Semi-Persistent Scheduling release is indicated by using the downlink control information. The uplink reception includes at least one prescribed MAC control element.

(4) A communication method for a terminal device according to an aspect of the present invention includes the steps of: receiving, from a base station device, a parameter included in an RRC message; receiving downlink control information from the base station device by using a physical downlink control channel; storing an uplink grant received from the base station device, as a configured uplink grant; delivering the configured uplink grant to a HARQ entity, in a case that the parameter is configured and a Semi-Persistent Scheduling release is indicated by using the downlink control information; and clearing the configured uplink grant, in a case that the parameter is not configured and the Semi-Persistent Scheduling release is indicated by using the downlink control information.

(5) A communication method for a base station device according to an aspect of the present invention includes the steps of: transmitting, to a terminal device, a parameter included in an RRC message; transmitting downlink control information to the terminal device, by using a physical downlink control channel; storing an uplink grant transmitted to the terminal device, as a configured uplink grant; clearing the configured uplink grant after an uplink reception in a case that the parameter is configured and a Semi-Persistent Scheduling release is indicated by using the downlink control information; and clearing the configured uplink grant in a case that the parameter is not configured and the Semi-Persistent Scheduling release is indicated by using the downlink control information. The uplink reception includes at least one prescribed MAC control element.

(6) An integrated circuit to be mounted on a terminal device according to an aspect of the present invention causes the terminal device to perform functions to: receive, from a base station device, a parameter included in an RRC message; receive downlink control information from the base station device, by using a physical downlink control channel; store an uplink grant received from the base station device, as a configured uplink grant; and deliver the configured uplink grant to a HARQ entity, in a case that the parameter is configured and a Semi-Persistent Scheduling release is indicated by using the downlink control information, and clear the configured uplink grant, in a case that the parameter is not configured and the Semi-Persistent Scheduling release is indicated by using the downlink control information.

(7) An integrated circuit to be mounted on a base station device according to an aspect of the present invention causes the base station device to perform functions to: transmit, to a terminal device, a parameter included in an RRC message; transmit downlink control information to the terminal device, by using a physical downlink control channel; store an uplink grant transmitted to the terminal device, as a configured uplink grant; and clear the configured uplink grant after an uplink reception, in a case that the parameter is configured and a Semi-Persistent Scheduling release is indicated by using the downlink control information, and clear the configured uplink grant, in a case that the parameter is not configured and the Semi-Persistent Scheduling release is indicated by using the downlink control information, and the uplink reception includes at least one prescribed MAC control element.

Advantageous Effects of Invention

According to the present invention, uplink data can be transmitted efficiently.

BRIEF DESCRIPTION OF DRAWINGS

FIG. 3 is a diagram illustrating an example of special fields for activation of Semi-Persistent Scheduling according to the present embodiment.

FIG. 4 is a diagram illustrating an example of special fields for release of the Semi-Persistent Scheduling according to the present embodiment.

DESCRIPTION OF EMBODIMENTS

Embodiments of the present invention will be described below.

Figure 1:
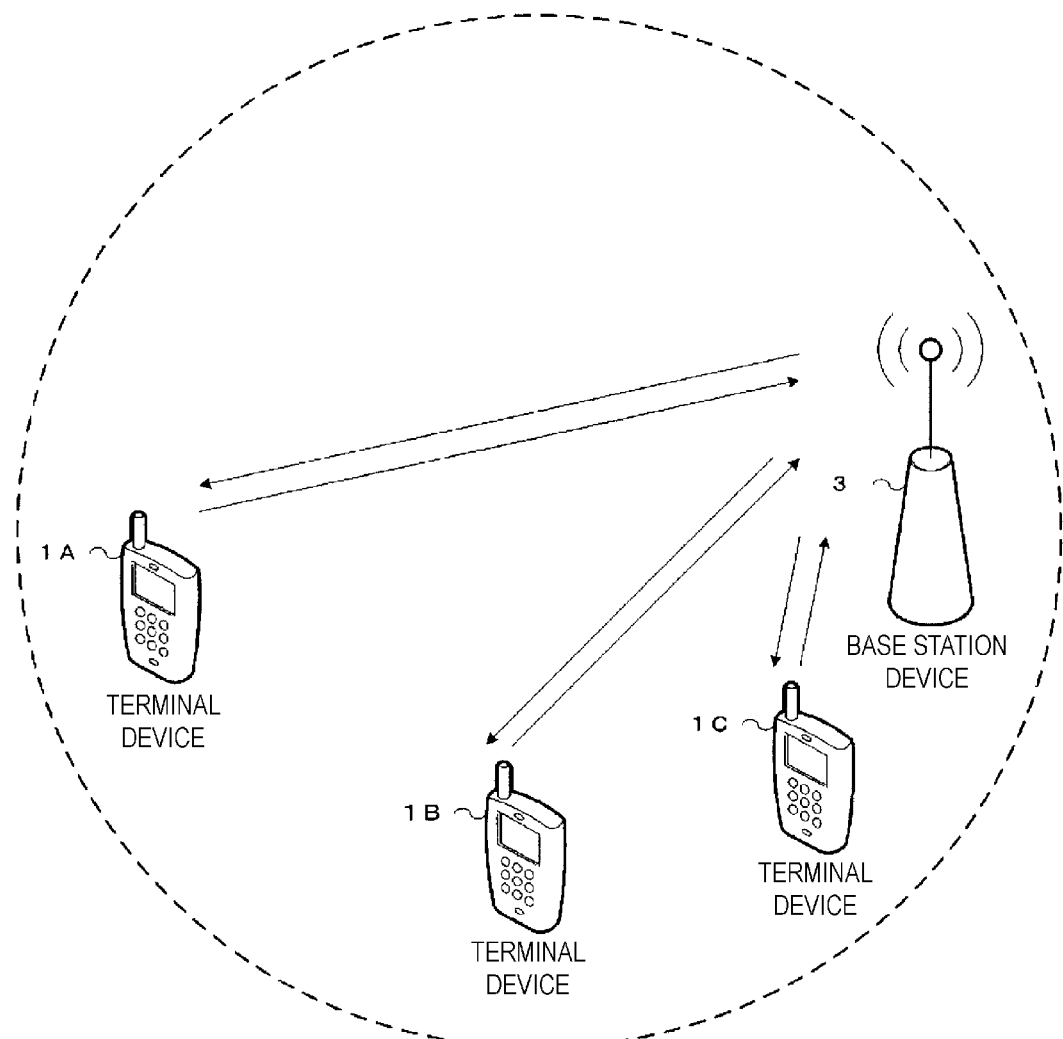
FIG. 1 is a diagram illustrating a concept of a radio communication system according to the present embodiment.

FIG. 1 is a conceptual diagram of a radio communication system according to the present embodiment. In FIG. 1, the radio communication system includes terminal devices 1A to 1C and a base station device 3. Hereinafter, the terminal devices 1A to 1C are each also referred to as a terminal device 1.

Physical channels and physical signals according to the present embodiment will be described.

With respect to FIG. 1, the following uplink physical channels are used for uplink radio communication from the terminal device 1 to the base station device 3. Here, the uplink physical channels are used to transmit information output from the higher layers.

Physical Uplink Control CHannel (PUCCH)
Physical Uplink Shared CHannel (PUSCH)
Physical Random Access CHannel (PRACH)

The PUCCH is used for transmission of Uplink Control Information (UCI). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). HARQ-ACK may indicate HARQ-ACK for downlink data (Transport block, Medium Access Control Protocol Data Unit (MAC PDU), Downlink-Shared CHannel (DL-SCH), or Physical Downlink Shared CHannel (PDSCH)).

In other words, HARQ-ACK may indicate ACKnowledgment (ACK) or Negative-ACKnowledgment (NACK). Here, HARQ-ACK may also be referred to as ACK/NACK, HARQ feedback, HARQ acknowledgment, HARQ information, or HARQ control information.

The PUSCH is used for transmission of uplink data (UpLink-Shared Channel (UL-SCH)). Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station device 3 and the terminal device 1 exchange (transmit and/or receive) signals with each other in their respective higher layers. For example, the base station device 3 and the terminal device 1 may transmit and receive, in a Radio Resource Control layer, RRC signaling (also referred to as Radio Resource Control message (RRC message) or Radio Resource Control information (RRC information)) to and from each other. The base station device 3 and the terminal device 1 may transmit and receive a Medium Access Control (MAC) control element in a MAC layer, respectively. Here, the RRC signaling and/or the MAC control element is also referred to as higher layer signaling.

The PUSCH may be used to transmit the RRC signaling and the MAC control element. Here, the RRC signaling transmitted from the base station device 3 may be signaling common to multiple terminal devices 1 in a cell. The RRC signaling transmitted from the base station device 3 may be signaling dedicated to a certain terminal device 1 (also referred to as dedicated signaling). In other words, user-equipment-specific information (information unique to user equipment) may be transmitted through signaling dedicated to the certain terminal device 1.

The PRACH is used to transmit a random access preamble. The PRACH may be used for an initial connection establishment procedure, a handover procedure, a connection re-establishment procedure, uplink transmission synchronization (Timing Adjustment), and designating a PUSCH resource request.

In FIG. 1, the following uplink physical signal is used in the uplink radio communication. Here, the uplink physical signal is not used to transmit information output from the higher layers but is used by the physical layer.

UpLink Reference Signal (UL RS)

According to the present embodiment, the following two types of uplink reference signals are used.

DeModulation Reference Signal (DMRS)

Sounding Reference Signal (SRS)

The DMRS is associated with transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station device 3 uses the SRS in order to measure an uplink channel state.

In FIG. 1, the following downlink physical channels are used for downlink radio communication from the base station device 3 to the terminal device 1. Here, the downlink physical channels are used to transmit the information output from the higher layers.

Physical Broadcast CHannel (PBCH)

Physical Control Format Indicator CHannel (PCFICH)

Physical Hybrid automatic repeat request Indicator CHannel (PHICH)

Physical Downlink Control CHannel (PDCCH)

Enhanced Physical Downlink Control CHannel (EPDCCH)

Physical Downlink Shared CHannel (PDSCH)

Physical Multicast CHannel (PMCH)

The PBCH is used for broadcasting a Master Information Block (MIB), or a Broadcast CHannel (BCH), that is shared by the terminal devices 1.

The PCFICH is used for transmission of information indicating a region (OFDM symbols) to be used for transmission of the PDCCH.

The PHICH is used for transmission of a HARQ indicator (HARQ feedback or response information) indicating an ACKnowledgement (ACK) or a Negative ACKnowledgement (NACK) for the uplink data (UpLink Shared CHannel (UL-SCH)) received by the base station device 3.

The PDCCH and the EPDCCH are used for transmission of Downlink Control Information (DCI). Here, multiple DCI formats are defined for transmission of the downlink control information. In other words, a field for the downlink control information is defined in a DCI format and is mapped to information bits.

For example, DCI formats for downlink (e.g., DCI format 1, DCI format 1A and/or DCI format 1C) to be used for the scheduling of one PDSCH in one cell (transmission of a single downlink transport block) may be defined.

Here, each of the downlink DCI formats includes information of the scheduling of the PDSCH. For example, the downlink DCI format includes downlink control information such as a Carrier Indicator Field (CIF), information of a HARQ process number, information of a Modulation and Coding Scheme (MCS), information of a Redundancy version, and/or information of Resource block assignment. Here, the downlink DCI format is also referred to as downlink grant and/or downlink assignment.

Furthermore, for example, DCI formats for uplink (e.g., DCI format 0 and DCI format 4) to be used for the scheduling of one PUSCH in one cell (transmission of a single uplink transport block) are defined.

Here, each of the uplink DCI formats includes information of the scheduling of the PUSCH. For example, the uplink DCI format includes downlink control information such as a Carrier Indicator Field (CIF), information of a Transmit Power Command (TPC command) for a scheduled PUSCH, information of cyclic shift DMRS, information of a Modulation and Coding Scheme (MCS) and/or redundancy version, and/or, information of Resource block assignment and/or hopping resource allocation. Here, the uplink DCI format is also referred to as uplink grant and/or Uplink assignment.

In a case that a PDSCH resource is scheduled in accordance with the downlink assignment, the terminal device 1 may receive downlink data on the scheduled PDSCH. In a case that a PUSCH resource is scheduled in accordance with the uplink grant, the terminal device 1 may transmit uplink data and/or uplink control information of the scheduled PUSCH.

Here, the terminal device 1 may monitor a set of PDCCH candidates and/or EPDCCH candidates. The PDCCH may indicate a PDCCH and/or an EPDDCH below. Here, the PDCCH candidates are candidates which the PDCCH may be mapped to and/or transmitted on by the base station device 3. Furthermore, "monitor" may imply that the terminal device 1 attempts to decode each PDCCH in the set of PDCCH candidates in accordance with each of all the monitored DCI formats.

The set of PDCCH candidates to be monitored by the terminal device 1 is also referred to as a search space. The search space may include a Common Search Space (CSS). For example, the CSS may be defined as a space common to multiple terminal devices 1. The search space may include a UE-specific Search Space (USS). For example, the USS may be defined at least based on a C-RNTI assigned to the terminal device 1. The terminal device 1 may monitor the PDCCHs in the CSS and/or USS to detect a PDCCH destined for the terminal device 1 itself.

Here, an RNTI assigned to the terminal device 1 by the base station device 3 is used for the transmission of the downlink control information (transmission on the PDCCH). Specifically, Cyclic Redundancy Check (CRC) parity bits are appended to the DCI format (or downlink control information), and after the appending, the CRC parity bits are scrambled with the RNTI. Here, the CRC parity bits appended to the DCI format may be obtained from a payload of the DCI format.

The terminal device 1 attempts to decode the DCI format to which the CRC parity bits scrambled with the RNTI are attached, and detects, as a DCI format destined for the terminal device 1 itself, the DCI format for which the CRC has been successful (also referred to as blind coding). In other words, the terminal device 1 may detect the PDCCH with the CRC scrambled with the RNTI. The terminal device 1 may detect the PDCCH including the DCI format to which the CRC parity bits scrambled with the RNTI are attached.

Here, the RNTI may include a Cell-Radio Network Temporary Identifier (C-RNTI). The C-RNTI is an identifier unique to the terminal device 1 and used for the identification in RRC connection and scheduling. The C-RNTI may be used for dynamically scheduled unicast transmission.

The RNTI may further include a Semi-Persistent Scheduling C-RNTI (SPS C-RNTI). The SPS C-RNTI is an identifier unique to the terminal device 1 and used for semi-persistent scheduling. The SPS C-RNTI may be used for semi-persistently scheduled unicast transmission.

Here, the semi-persistently scheduled transmission includes meaning of periodically scheduled transmission. For example, the SPS C-RNTI may be used for activation, reactivation, and/or re-transmission of the semi-persistently scheduled transmission. Hereinafter, the activation may include meaning of the reactivation and/or the re-transmission.

The SPS C-RNTI may be used for release and/or deactivation of the semi-persistently scheduled transmission. Hereinafter, the release may include meaning of the deactivation. Here, an RNTI may be newly defined for the latency reduction. For example, the SPS C-RNTI in the present embodiment may include an RNTI newly defined for the latency reduction.

The RNTI may include a Random Access RNTI (RA-RNTI). The RA-RNTI is an identifier used for transmission of a random access response message. In other words, the RA-RNTI is used for the transmission of the random access response message in a random access procedure. For example, the terminal device 1 may monitor the PDCCH with the CRC scrambled with the RA-RNTI after the transmission of a random access preamble. The terminal device 1 may receive a random access response on the PDSCH in accordance with detection of the PDCCH with the CRC scrambled with the RA-RNTI.

The RNTI may further include a Paging RNTI (P-RNTI). The P-RNTI is an identifier used for paging and notification of system information modification. For example, the P-RNTI is used for paging and transmission of a system information message. For example, the terminal device 1 may receive paging on the PDSCH in accordance with detection of the PDCCH with the CRC scrambled with the P-RNTI.

The RNTI may further include a System Information RNTI (SI-RNTI). The SI-RNTI is an identifier used for broadcast of the system information. For example, the SI-RNTI is used for transmission of the system information message. For example, the terminal device 1 may receive the system information message on the PDSCH in accordance with detection of the PDCCH with the CRC scrambled with the SI-RNTI.

Here, for example, the PDCCH with the CRC scrambled with the C-RNTI may be transmitted in the USS or CSS. The PDCCH with the CRC scrambled with the RA-RNTI may be transmitted only in the CSS. The PDCCH with the CRC scrambled with the P-RNTI may be transmitted only in the CSS. The PDCCH with the CRC scrambled with the SI-RNTI may be transmitted only in the CSS.

The PDCCH with the CRC scrambled with the SPS C-RNTI may be transmitted only in a primary cell and primary secondary cell. The PDCCH with the CRC scrambled with the SPS C-RNTI may be transmitted in the USS or CSS.

The PDSCH is used for transmission of downlink data (DownLink Shared CHannel (DL-SCH)). The PDSCH is used to transmit a system information message. Here, the system information message may be cell-specific information (information unique to a cell). The system information is included in RRC signaling. The PDSCH is used to transmit the RRC signaling and the MAC control element.

The PMCH is used for transmission of multicast data (Multicast CHannel (MCH)).

In FIG. 1, the following downlink physical signals are used for downlink radio communication. Here, the downlink physical signals are not used to transmit the information output from the higher layers but is used by the physical layer.

Synchronization Signal (SS)
DownLink Reference Signal (DL RS)

The synchronization signal is used for the terminal device 1 to be synchronized to frequency and time domains in the downlink. In the TDD scheme, the synchronization signal is mapped to subframes 0, 1, 5, and 6 within a radio frame. In the FDD scheme, the Synchronization signal is mapped to subframes 0 and 5 within a radio frame.

The downlink reference signal is used for the terminal device 1 to perform channel compensation on a downlink physical channel. The downlink reference signal is used in order for the terminal device 1 to obtain the downlink channel state information.

According to the present embodiment, the following five types of downlink reference signals are used.

Cell-specific Reference Signal (CRS)
UE-specific Reference Signal (URS) associated with the PDSCH
DeModulation Reference Signal (DMRS) associated with the EPDCCH
Non-Zero Power Channel State Information-Reference Signal (NZP CSI-RS)
Zero Power Channel State Information-Reference Signal (ZP CSI-RS)
Multimedia Broadcast and Multicast Service over Single Frequency Network Reference Signal (MBSFN RS)
Positioning Reference Signal (PRS)

Here, the downlink physical channel and the downlink physical signal are collectively referred to as a downlink signal. The uplink physical channel and the uplink physical signal are collectively referred to as an uplink signal. The downlink physical channels and the uplink physical channels are collectively referred to as physical channels. The downlink physical signals and the uplink physical signals are collectively referred to as physical signals.

The BCH, the MCH, the UL-SCH, and the DL-SCH are transport channels. A channel used in the Medium Access Control (MAC) layer is referred to as a transport channel. A unit of the transport channel used in the MAC layer is also referred to as a Transport Block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

Now, carrier aggregation will be described.

In the present embodiment, one or multiple serving cells may be configured for the terminal device 1. A technology in which the terminal device 1 communicates via the multiple serving cells is referred to as cell aggregation or carrier aggregation.

Here, the present embodiment may apply to one or each of the multiple serving cells configured for the terminal device 1. Alternatively, the present embodiment may apply to one or some of the multiple serving cells configured for the terminal device 1. Alternatively, the present embodiment may apply to one or each of the multiple serving cell groups configured for the terminal device 1.

In the present embodiment, Time Division Duplex (TDD) and/or Frequency Division Duplex (FDD) may be applied. Here, for the carrier aggregation, TDD or FDD may apply to one or all of the multiple serving cells. Alternatively, for the carrier aggregation, serving cells to which TDD applies and serving cells to which FDD applies may be aggregated. Here, a frame structure for FDD is also referred to as Frame structure type 1. A frame structure for TDD is also referred to as Frame structure type 2.

Here, one or multiple configured serving cells may include one primary cell and one or multiple secondary cells. For example, the primary cell may be a serving cell in which an initial connection establishment procedure has been performed, a serving cell in which a connection re-establishment procedure has been initiated, or a cell designated as the primary cell by a handover procedure. Here, upon an RRC connection being established or later, a secondary cell(s) may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

Here, the transmission on the PUCCH may be performed only in the primary cell. The primary cell cannot be deactivated. Cross-carrier scheduling does not apply to the primary cell. In other words, the primary cell is always scheduled via its PDCCH.

The secondary cell is activated and/or deactivated. In a case that PDCCH (or PDCCH monitoring) of a certain secondary cell is configured, cross-carries scheduling may not apply this secondary cell. To be more specific, in this case, the secondary cell may always be scheduled via its PDCCH. In a case that no PDCCH (or PDCCH monitoring) of a certain secondary cell is configured, cross-carrier scheduling applies to the secondary cell, and the secondary cell may always be scheduled via the PDCCH of one other serving cell.

A configuration of a slot according to the present embodiment will be described below.

Figure 2:
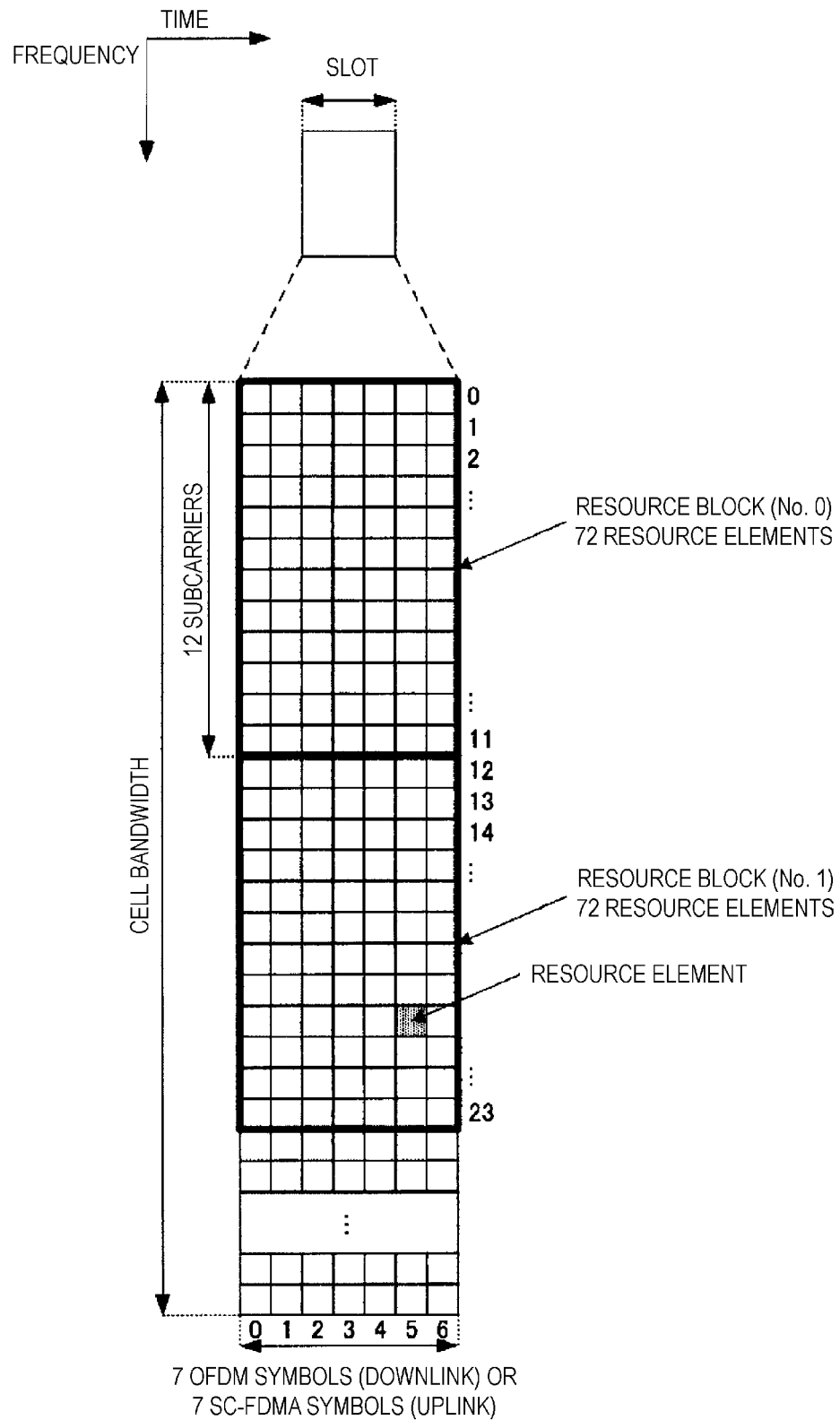
FIG. 2 is a diagram illustrating a configuration of a slot according to the present embodiment.

FIG. 2 is a diagram illustrating the configuration of the slot according to the present embodiment. In FIG. 2, a horizontal axis represents a time axis, and a vertical axis represents a frequency axis. Here, a normal Cyclic Prefix (CP) may apply to an OFDM symbol. Alternatively, an extended Cyclic Prefix (CP) may apply to the OFDM symbol. The physical signal or physical channel transmitted in each of the slots is expressed by a resource grid.

Here, in the downlink, the resource grid may be defined with multiple subcarriers and multiple OFDM symbols. In the uplink, the resource grid may be defined with multiple subcarriers and multiple SC-FDMA symbols. The number of subcarriers constituting one slot may depend on a cell bandwidth. The number of OFDM symbols or SC-FDMA symbols constituting one slot may be seven. Here, each element within the resource grid is referred to as a resource element. The resource element may be identified by a subcarrier number and an OFDM symbol or SC-FDMA symbol number.

Here, a resource block may be used to express mapping of a certain physical channel (PDSCH, PUSCH, or the like) to resource elements. For the resource block, a virtual resource block and a physical resource block may be defined. A certain physical channel may be first mapped to the virtual resource block. Thereafter, the virtual resource block may be mapped to the physical resource block. One physical resource block may be defined with seven consecutive OFDM symbols or SC-FDMA symbols in the time domain and 12 consecutive subcarriers in the frequency domain. Thus, one physical resource block may include (7×12) resource elements. Furthermore, one physical resource block may correspond to one slot in the time domain and correspond to 180 kHz in the frequency domain. The physical resource blocks may be numbered from zero in the frequency domain.

Here, in the present embodiment, basically, the Semi-Persistent Scheduling (SPS) is described as a scheduling method for transmitting the uplink data, but the scheduling described in the present embodiment is not limited to the Semi-Persistent Scheduling. To be more specific, the scheduling method described in the present embodiment is not necessarily to be called the Semi-Persistent Scheduling. In other words, the uplink data transmission method described in the present embodiment is not limited to the uplink data transmission method based on the Semi-Persistent Scheduling, but, of course, the present embodiment includes those similar to the uplink data transmission method described in the present embodiment.

In the present embodiment, for the description of the processing in the terminal device 1, described are processing of the MAC entity in the terminal device 1, a "Multiplexing and assembly" entity in the terminal device 1 (hereinafter, also referred to as a first entity), and/or an HARQ entity in the terminal device 1. In other words, the present embodiment describes the processing of the MAC entity in the terminal device 1, the first entity in the terminal device 1, and/or the HARQ entity in the terminal device 1, but, of course, the processing in the present embodiment is the processing in the terminal device 1.

The present embodiment basically describes behavior (processing) of the terminal device 1, but, of course, the base station device 3 performs similar behavior (processing) correspondingly to the behavior (processing) of the terminal device 1.

Here, the transmission on the PUSCH (which may be transmission on the UL-SCH) is performed at a timing based on a System Frame Number (SFN) and the subframe. To be more specific, in order to specify the timing for the transmission on the PUSCH, the SFN and a subframe number/index in the radio frame corresponding to the SFN are needed. Here, the SFN is a number/index of a radio frame.

Hereinafter, for the purpose of simple description, the SFN (radio frame) and subframe transmitted on the PUSCH are also simply described as the subframe. In other words, the subframe in the following description may include meanings of the SFN (radio frame) and subframe.

Here, the base station device 3 may configure an interval (period) of the uplink Semi-Persistent Scheduling for the terminal device 1. For example, the base station device 3 may transmit a first parameter and/or second parameter for indicating a value of the interval of the uplink Semi-Persistent Scheduling to the terminal device 1 by including the parameters in higher layer signaling (RRC message).

For example, the base station device 3 may use the first parameter and/or second parameter to configure the interval value of the Semi-Persistent Scheduling as 10 (10 subframes), 20 (20 subframes), 32 (32 subframes), 40 (40 subframes), 64 (64 subframes), 80 (80 subframes), 128 (128 subframes), 160 (160 subframes), 320 (320 subframes), and/or 640 (640 subframes).

The base station device 3 may use the first parameter and/or second parameter to configure the interval value of the Semi-Persistent Scheduling as 1 (1 subframe), 10 (10 subframes), 20 (20 subframes), 32 (32 subframes), 40 (40 subframes), 64 (64 subframes), 80 (80 subframes), 128 (128 subframes), 160 (160 subframes), 320 (320 subframes), and/or 640 (640 subframes).

To be more specific, the base station device 3 may use the first parameter and/or second parameter to configure the interval value of the Semi-Persistent Scheduling as 1 (1 subframe).

For example, the first parameter and/or the second parameter may be configured for each serving cell. The first parameter may be configured for the primary cell. The second parameter may be configured for the primary cell and/or the secondary cell (may be configured for each serving cell). The interval value of the Semi-Persistent Scheduling, "1 (1 subframe)", may be configured for the primary cell and/or the secondary cell (may be configured for each serving cell).

The base station device 3 may use the uplink DCI format (e.g., DCI format 0) to allocate a semi-persistent (semi-permanent, semi-persistent or periodical) PUSCH resource (physical resource block) to the terminal device 1, and instruct the terminal device 1 to activate the transmission on the semi-persistent PUSCH. The base station device 3 may use the uplink DCI format to instruct the terminal device 1 to release the semi-persistent PUSCH resource.

For example, in a case that CRC parity bits attached to the DCI format are scrambled with the SPS C-RNTI, and a field of information of a New Data Indicator included within the DCI format is set to '0', the terminal device 1 may verify (confirm, or check) whether multiple information fields included within the DCI format are set to specific values. To be more specific, the CRC parity bits attached to the DCI format scrambled with the SPS C-RNTI, and the field of the information of the New Data Indicator may be used for validation of the Semi-Persistent Scheduling.

Here, in a case that the verification is succeeded, the terminal device 1 may consider (recognize) that the received DCI format indicates a valid semi-persistent activation or a valid semi-persistent release. In a case that the verification is not succeeded, the terminal device 1 may discard (clear) this DCI format.

Here, the semi-persistent activation may include meaning of activation of the Semi-Persistent Scheduling. The semi-persistent activation may also include meaning of semi-persistent allocation of the PUSCH resource. The semi-persistent release may include meaning of release of the Semi-Persistent Scheduling.

To be more specific, the DCI format may be used to indicate the activation of semi-persistent uplink scheduling. The DCI format may be used to enable activation of the Semi-Persistent Scheduling. The DCI format may be used to indicate the semi-persistent release.

FIG. 3 is a diagram illustrating an example of Special fields for activation of the Semi-Persistent Scheduling. As illustrated in FIG. 3, multiple fields may be defined for activation of the Semi-Persistent Scheduling. A predetermined value (that may be a specific value) set in each of multiple fields may be defined for activation of the Semi-Persistent Scheduling.

As illustrated in FIG. 3, for example, in a case that the uplink DCI format (e.g., DCI format 0) is used for activation of the Semi-Persistent Scheduling, a field of information of the TPC command for the scheduled PUSCH included within the uplink DCI format may be set to '00', a field of information of the Cyclic shift DMRS may be set to '000', and the Most Significant Bit (MSB) of a field of information of the Modulation and Coding Scheme (MCS) and redundancy version may be set to '0'.

For example, in a case that the downlink DCI format (e.g., DCI format 1 and/or DCI format 1A) is used for activation of the Semi-Persistent Scheduling, a field of information of a HARQ process number included within the downlink DCI format may be set to '000 (for FDD)' or '0000 (for TDD)', the Most Significant Bit (MSB) of a field of information of the Modulation and Coding scheme (MCS) may be set to '0', and a field of information of the redundancy version may be set to '00'.

In other words, in a case that each of multiple information fields included within the DCI format is set to a specific value defined in advance, the terminal device 1 may activate the Semi-Persistent Scheduling. Here, multiple information fields and predetermined values to which the information fields are set which are used for activation of the Semi-Persistent Scheduling are not limited to the examples described above, of course. For example, multiple information fields and predetermined values to which the information fields are set which are used for activation of the Semi-Persistent Scheduling may be defined by specifications or the like in advance to be used as information known to both the base station device 3 and the terminal device 1.

FIG. 4 is a diagram illustrating an example of Special fields for release of the Semi-Persistent Scheduling. As illustrated in FIG. 4, multiple fields may be defined for release of the Semi-Persistent Scheduling. A predetermined value (that may be a specific value) set in each of multiple fields may be defined for release of the Semi-Persistent Scheduling.

As illustrated in FIG. 4, for example, in a case that the uplink DCI format (e.g., DCI format 0) is used for release of the Semi-Persistent Scheduling, the field of the information of the TPC command for the scheduled PUSCH included within the uplink DCI format may be set to '00', the field of the information of the Cyclic shift DMRS may be set to '000', the field of the information of the Modulation and Coding Scheme (MCS) and redundancy version may be set to '11111', and a field of information of Resource block assignment and hopping resource allocation (that may be all fields of multiple fields) may be set to '1'.

In other words, in a case that the uplink DCI format is used for release of the Semi-Persistent Scheduling, the field associated with the resource block assignment (resource allocation) may be set to a value defined in advance for release.

For example, in a case that the downlink DCI format (e.g., DCI format 1 and/or DCI format 1A) is used for release of the Semi-Persistent Scheduling, the field of the information of the HARQ process number included within the downlink DCI format may be set to '000 (for FDD)' or '0000 (for TDD)', the field of the information of the Modulation and Coding Scheme (MCS) may be set to '11111', the field of the information of the redundancy version may be set to '00', and the field of the information of the Resource block assignment (that may be all fields of multiple fields) may be set to '1'.

In other words, in a case that the downlink DCI format is used for release of the Semi-Persistent Scheduling, the field associated with the resource block assignment (resource allocation) may be set to a value defined in advance for release.

In other words, in the case that each of multiple information fields included within the DCI format is set to a specific value defined in advance, the terminal device 1 may release the Semi-Persistent Scheduling. Here, multiple information fields and predetermined values to which the information fields are set which are used for release of the Semi-Persistent Scheduling are not limited to the examples described above, of course. For example, multiple information fields and predetermined values to which the information fields are set which are used for release of the Semi-Persistent Scheduling may be defined by specification or the like in advance to be used as information known to both the base station device 3 and the terminal device 1.

Here, the Semi-Persistent Scheduling may be supported only in the primary cell and the primary secondary cell. To be more specific, the DCI format to which the CRC parity bits scrambled with the SPS C-RNTI are attached may be transmitted only for the primary cell and the primary secondary cell. The DCI format to which the CRC parity bits scrambled with the C-RNTI are attached may be transmitted for the primary cell, the primary secondary cell, and/or the secondary cell(s).

For example, the DCI format to which the CRC parity bits scrambled with the SPS C-RNTI are appended may be transmitted to the secondary cell in a case that the interval value of the Semi-Persistent Scheduling as "1 (1 subframe)" is configured for the secondary cell.

Here, the terminal device 1 has to have a valid uplink grant for performing the transmission on the UL-SCH (transmission on the UL-SCH via the PUSCH, and/or UL-SCH transmission on the PUSCH). Here, the uplink grant may include meaning that uplink transmission in a certain subframe is granted (permitted, or given).

For example, the valid uplink grant may be dynamically received on the PDCCH. To be more specific, the valid uplink grant may be indicated using the DCI format to which the CRC parity bits scrambled with the C-RNTI are attached. The valid uplink grant may be semi-permanently configured. To be more specific, the valid uplink grant may be indicated using the DCI format to which the CRC parity bits scrambled with the SPS C-RNTI are attached.

The terminal device 1 may store the uplink grant dynamically received on the PDCCH and/or the semi-permanently configured uplink grant. Here, the HARQ entity may deliver the uplink grant dynamically received on the PDCCH and/or the semi-permanently configured uplink grant to a HARQ process, and the HARQ process may store the uplink grant received from the HARQ entity. Hereinafter, the uplink grant dynamically received on the PDCCH and/or semi-permanently configured uplink grant which are to be stored are referred to as a stored uplink grant.

In the case of being instructed to perform the semi-persistent activation, the terminal device 1 (MAC entity) may store the DCI format received from the base station device 3 as a configured uplink grant. Here, the configured uplink grant may be referred to as a configured Semi-Persistent Scheduling UpLink grant (SPS UL grant), or a configured grant. The configured uplink grant may be referred to as a configured uplink grant, a configured Semi-Persistent Scheduling UpLink grant (SPS UL grant), or a configured grant.

Here, based on that the UpLink grant (SPS UL grant) stored by the MAC entity is cleared, the UpLink grant (SPS UL grant) stored by the HARQ process may not be cleared. To be more specific, even in a case that the UpLink grant (SPS UL grant) stored by the MAC entity is cleared, re-transmission on the semi-persistent PUSCH can be continued based on the UpLink grant (SPS UL grant) stored by the HARQ process.

The Semi-Persistent Scheduling uplink grant may be referred to as a SPS uplink grant, a Semi-Persistent grant, and a Semi-persistent scheduling assignment.

The base station device 3 may configure validation and/or invalidation of the Semi-Persistent Scheduling for the terminal device 1. For example, the base station device 3 may configure validation and/or invalidation of the Semi-Persistent Scheduling by using higher layer signaling (e.g., RRC layer signaling).

In a case that the Semi-Persistent Scheduling is validated, the SPS C-RNTI, a parameter for indicating the interval value of the uplink Semi-Persistent Scheduling, a parameter for indicating the Number of empty transmissions before release (also referred to as a third parameter), and/or a SPS deactivation timer (also referred to as a fourth parameter) may be at least provided (configured). Here, the empty transmission (also referred to as transmission of empty) is described later. The third parameter and the fourth parameter are described later.

Here, for example, the terminal device 1 starts transmission of a certain subframe on the semi-persistent PUSCH, and then, may initialize or reinitialize the configured uplink grant such that the transmission on the semi-persistent PUSCH recurs based on Equation (1). To be more specific, the terminal device 1 may sequentially consider that the configured uplink grant occurs in a subframe satisfying Equation (1).

$$(10*SFN+subframe)=[(10*SFN_{start\_time}+subframe_{start\_time})+N*semiPersistSchedIntervalUL+Subframe\_Offset*(N modulo 2)] modulo 10240 \quad [\text{Equation 1}]$$

In other words, the terminal device 1, after configuring the SPS uplink grant, may set a value of Subframe_Offset, and recognize (consider sequentially) that the N-th grant (configured uplink grant, SPS uplink grant) occurs in the subframe specified based on Equation (1).

Here, the subframe satisfying Equation (1) is also referred to as a subframe satisfying a predetermined condition. The subframes among the subframes satisfying Equation (1) except for the first subframe are also referred to as subframes satisfying a predetermined condition. Here, the first subframe among the subframe satisfying Equation (1) may be a received subframe of the DCI which is used to indicate the activation or reactivation or release of the Semi-Persistent Scheduling.

Specifically, the terminal device 1 may specify the subframe for the transmission on the PUSCH corresponding to the N-th configured uplink grant, based on Equation (1), after configuring the stored DCI format as the SPS uplink grant. Here, in Equation (1), SFN and subframe represent the SFN and subframe, respectively, transmitted on the PUSCH.

In Equation (1), SFNstart-time and subframestart-time represent the SFN and subframe, respectively, at the time configured uplink grant are initialized or reinitialized. To be more specific, SFNstart-time and subframestart-time represent, the SFN and subframe starting the transmission on the PUSCH, based on the configured uplink grant (i.e., the subframe for an initial transmission on the PUSCH corresponding to the 0-th configured uplink grant).

In Equation (1), semiPersistSchedIntervalUL represents the interval of the uplink Semi-Persistent Scheduling. In Equation (1), Subframe_Offset represents an offset value used to specify the subframe for the transmission on the PUSCH.

Here, the terminal device 1 may set Subframe_Offset in Equation (1) to '0' in a case that a parameter (twoInterval-Config) is not validated by higher layer after configuring the SPS uplink grant.

The initialization may be performed in a case that the Semi-Persistent Scheduling is not activated. The reinitialization may be performed in a case that the Semi-Persistent Scheduling is already activated. Here, the initialization may include meaning of initial configuration, and the reinitialization may include meaning of re-initial configuration. In other words, the terminal device 1 may initialize or reinitialize the configured uplink grant to start the transmission on the PUSCH in a certain subframe.

Figure 5:
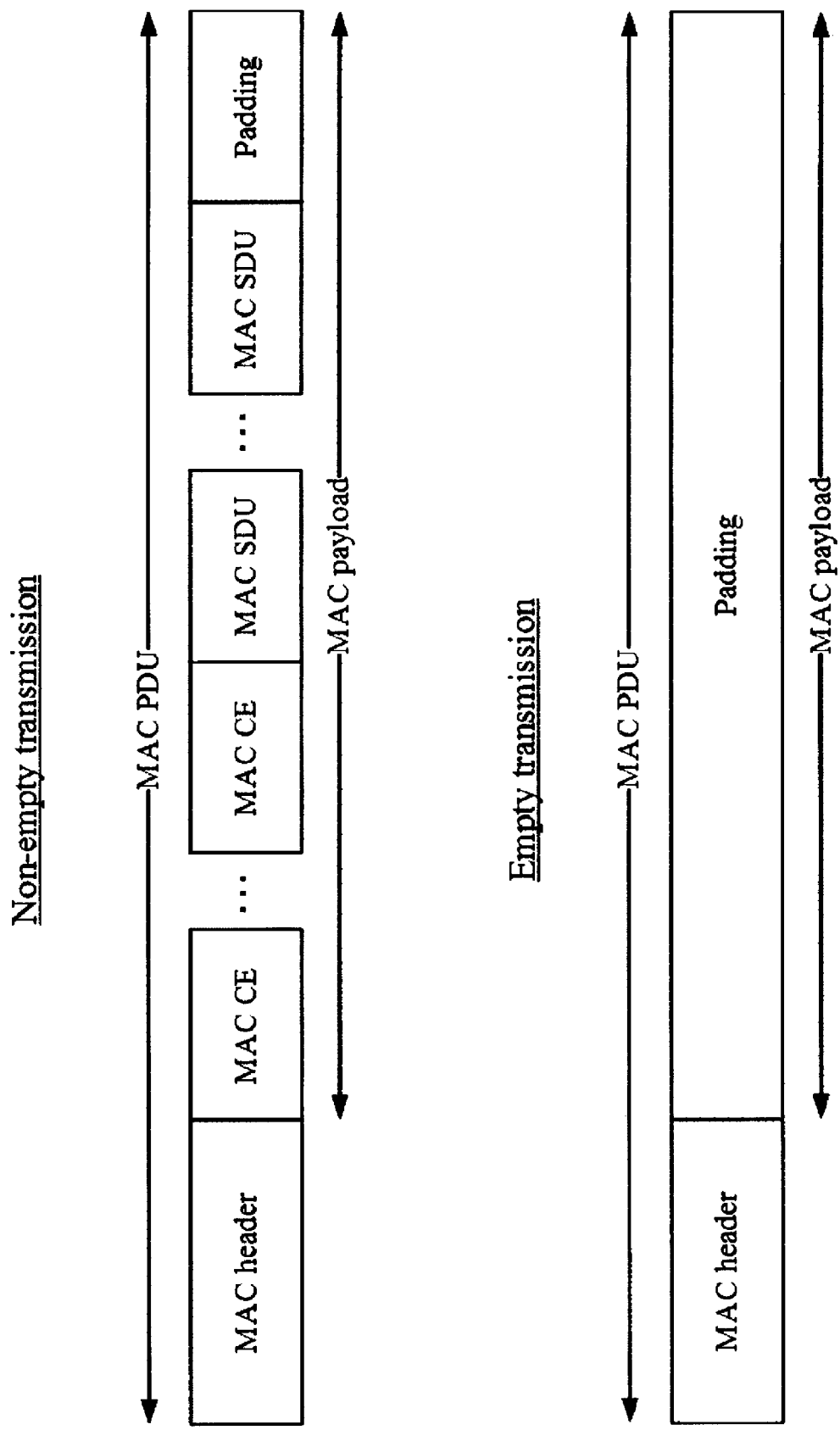
FIG. 5 is a diagram for describing examples of non-empty transmission and empty transmission according to the present embodiment.

FIG. 5 is a diagram for describing examples of Non-empty transmission and Empty transmission. As illustrated in FIG. 5, a MAC Protocol Data Unit (MAC PDU) may include a MAC header, a MAC Service Data Unit (MAC SDU), a MAC Control Element (MAC CE), and padding (padding bits). Here, the MAC protocol data unit may correspond to the uplink data (UL-SCH).

Here, there may be defined, as the MAC control element, multiple MAC control elements including at least a Buffer Status Report MAC control element (Buffer Status Report MAC CE, BSR MAC CE, which is a MAC control element used for buffer status report), a Timing Advance Command MAC control element (Timing Advance Command MAC CE, TAC MAC CE, which is a MAC control element used to transmit a timing advance command), a Power Headroom Report MAC control element (Power Headroom Report MAC CE, PHR MAC CE, which is a MAC control element used for power headroom report), and/or an Activation/Deactivation MAC control element (Activation/Deactivation MAC CE, which is a MAC control element used to transmit an activation/deactivation command).

There may be defined, as the buffer status report, multiple buffer status reports including at least a Regular BSR, a Periodic BSR, and a padding BSR. For example, the Regular BSR, the Periodic BSR, and the padding BSR may be triggered based on events (conditions) different from each other.

For example, the Regular BSR may be triggered in a case that data for a logical channel which belongs to a certain Logical Channel Group (LCG) becomes available for transmission, and priority for the transmission of the data is higher than the logical channels which belong to any LCG and for which data is already available for transmission, or in a case that there is no available data for transmission on the logical channels which belong to any LCG. The Regular BSR may also be triggered in a case that a predetermined timer (retxBSR-Timer) expires, and the terminal device 1 has available data for transmission for the logical channels which belong to a certain LCG.

The Periodic BSR may be triggered in a case that a prescribed timer (periodic BSR-Timer) expires. The padding BSR may be triggered in a case that the UL-SCH is allocated, and the number of padding bits is equal to or larger than a size of the Buffer Status Report MAC control element plus its subheader.

The terminal device 1 may use the buffer status report to notify the base station device 3 of a transmission data buffer size of the uplink data corresponding to each LCG as a message in the MAC layer.

As illustrated in FIG. 5, the MAC protocol data unit may contain zero, one, or multiple MAC service data units. The MAC protocol data unit may contain zero, one, or multiple MAC control elements. Padding may occur at the end of the MAC Protocol Data Unit (MAC PDU).

Here, the non-empty transmission may be transmission of the MAC protocol data unit including one or multiple MAC service data units (or may correspond to transmission of MAC protocol data unit including at least one or multiple MAC service data units).

The non-empty transmission may be transmission of the MAC protocol data unit including one or multiple first MAC control elements (or may correspond to transmission of the MAC protocol data unit including at least one or multiple first MAC control elements). Here, the first MAC control element (or a first predetermined MAC control element) may be defined in advance by specifications or the like, and may be information known to both the base station device 3 and the terminal device 1.

For example, the first MAC control element may contain one or all of the multiple MAC control elements described above. For example, the first MAC control element may be a Buffer Status Report MAC control element. The first MAC control element may be a Power Headroom Report MAC control element.

For example, the first MAC control element may be a Buffer Status Report MAC control element including a Regular BSR. The first MAC control element may be a Buffer Status Report MAC control element including a Periodic BSR. The first MAC control element may be a Buffer Status Report MAC control including a padding BSR.

To be more specific, the non-empty transmission may be transmission of the MAC protocol data unit including one or multiple MAC service data units and/or one or multiple first MAC control elements (or may correspond to transmission of the MAC protocol data unit including at least one or multiple MAC service data units and/or one or multiple first MAC control elements).

The empty transmission may be transmission of the MAC protocol data unit including only padding (or may correspond to transmission of the MAC protocol data unit including only padding). Here, the MAC header is appended to the transmission of the MAC protocol data unit including only padding.

The empty transmission may be transmission of the MAC protocol data unit including one or multiple second MAC control elements (or may correspond to transmission of the MAC protocol data unit including at least one or multiple second MAC control elements). Here, the second MAC control element (or a second predetermined MAC control element) may be defined in advance by specifications or the like, and may be information known to both the base station device 3 and the terminal device 1.

Here, the second MAC control element may be a MAC control element other than the first MAC control element. For example, the second MAC control element may contain one or all of the multiple MAC control elements described above. For example, the second MAC control element may be a Buffer Status Report MAC control element. The second MAC control element may be a Power Headroom Report MAC control element.

For example, the second MAC control element may be a Buffer Status Report MAC control element including a Regular BSR. The second MAC control element may be a Buffer Status Report MAC control element including a Periodic BSR. The second MAC control element may be a Buffer Status Report MAC control including a padding BSR.

To be more specific, the empty transmission may be transmission of the MAC protocol data unit including padding and/or only one or multiple second MAC control elements (or may correspond to transmission of the MAC protocol data unit including only padding and/or one or multiple second MAC control elements).

Here, the non-empty transmission and/or the empty transmission may be transmission corresponding to a new transmission. To be more specific, transmitting, in the new transmission, the MAC protocol data unit including at least one or multiple MAC service data units and/or one or multiple first MAC control elements may be referred to as the non-empty transmission. Transmitting, in the new transmission, the MAC protocol data unit including only padding and/or one or multiple second MAC control elements may be referred to as the empty transmission.

The non-empty transmission and/or the empty transmission may be performed on the PUSCH scheduled by the base station device 3. For example, the non-empty transmission and/or the empty transmission may be performed on the PUSCH scheduled by using the DCI (DCI format) to which the CRC parity bits scrambled with the C-RNTI are attached (i.e., dynamically scheduled PUSCH resource). The non-empty transmission and/or the empty transmission may be performed on the PUSCH scheduled by using the DCI (DCI format) to which the CRC parity bits scrambled with the SPS C-RNTI are attached (i.e., semi-permanently scheduled PUSCH resource).

As described above, the terminal device 1 may semi-permanently (semi-persistently or periodically) perform the transmission on the PUSCH (transmission on the UL-SCH) in the subframe specified based on Equation (1). Here, the terminal device 1 may clear the configured grant based on the third parameter (parameter for indicating the Number of empty transmissions before release) configured by the base station device 3.

For example, the terminal device 1 may clear the configured grant in a case that the number of consecutive empty transmissions corresponding to the initial transmission on the semi-persistent PUSCH reaches a value indicated by using the third parameter (the number of transmissions).

To be more specific, the terminal device 1 may clear the configured grant immediately after the third parameter corresponding to the number of consecutive new MAC Protocol Data Units (PDUs) each of which contains no MAC service data unit (i.e., each of which contains zero MAC SDUs). Here, the number of the consecutive empty transmissions corresponding to the initial transmission include the number of empty transmissions on the Semi-Persistent Scheduling resource. Here, the number of the consecutive empty transmissions corresponding to the initial transmission does not include the number of empty transmissions on the dynamically scheduled PUSCH resource.

Here, the terminal device 1 may release (clear) the uplink resource allocated by the base station device 3 (Semi-Persistent Scheduling resource, PUSCH resource), based on the third parameter. Specifically, the terminal device 1 may release the uplink resource allocated by the base station device 3 similarly to clearing the configured grant, based on the third parameter. Here, the terminal device 1, in a case of receiving the DCI format which is used to indicate the release of the Semi-Persistent Scheduling described above, may clear the configured grant and/or release the uplink resource.

Hereinafter, a first behavior refers to a behavior in which the terminal device 1 transmits the uplink data, and clears the configured grant and/or releases the uplink resource, based on the third parameter as described above. The first behavior also refers to a behavior in which the terminal device 1 transmits the uplink data, and clears the configured grant and/or releases the uplink resource in the case of receiving the DCI format which is used to indicate the release of the Semi-Persistent Scheduling as described above.

Here, in the first behavior, the terminal device 1 immediately clears the configured grant and/or releases the uplink resource in the case of receiving the DCI format which is used to indicate the release of the Semi-Persistent Scheduling. To be more specific, the terminal device 1 immediately clears the configured grant and/or releases the uplink resource without transmitting any information to the base station 3 in the case of receiving the DCI format which is used to indicate the release of the Semi-Persistent Scheduling.

Figure 6:
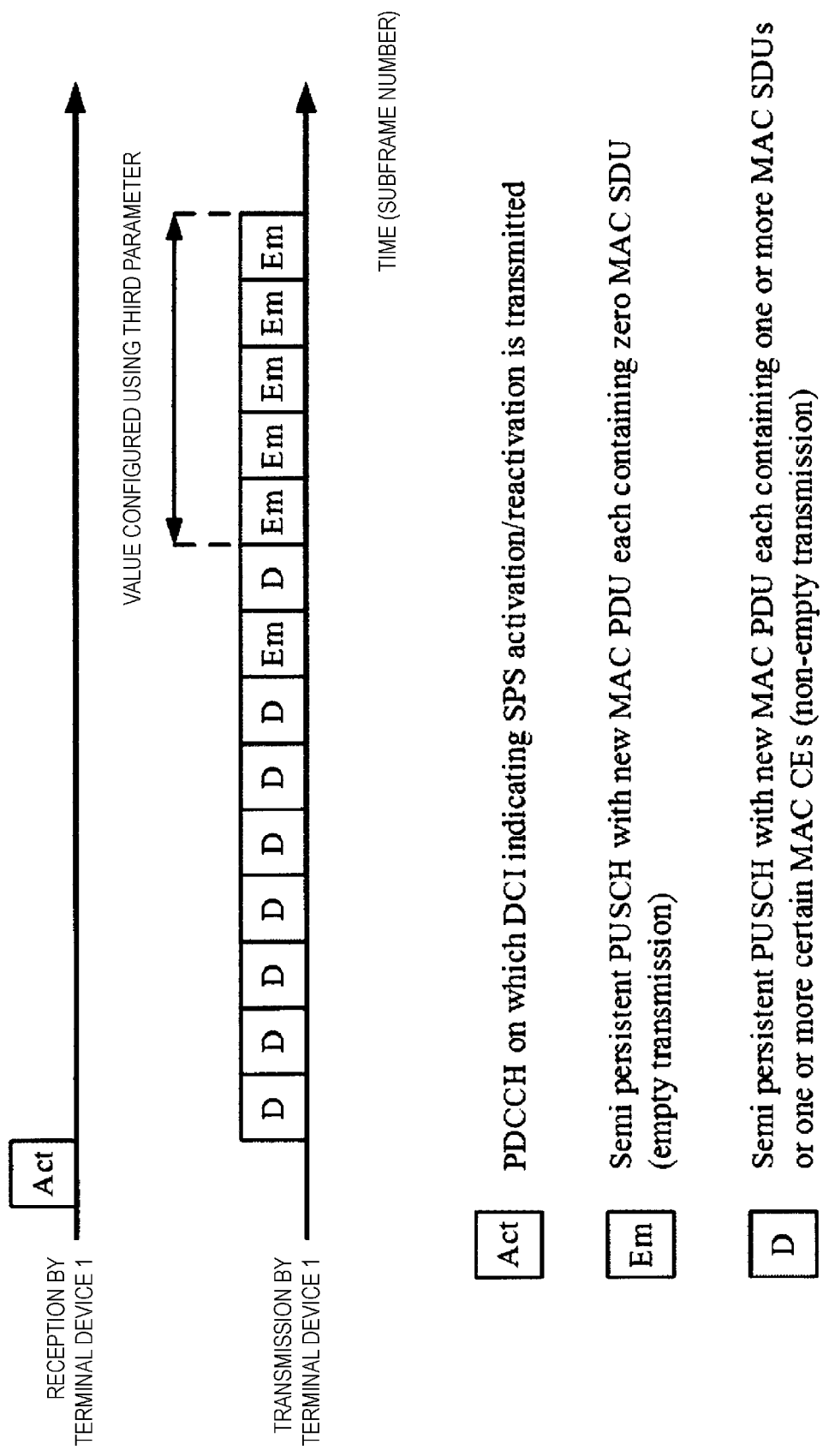
FIG. 6 is a diagram illustrating an example of an uplink data transmission method according to the present embodiment.

FIG. 6 is a diagram for describing a method for clearing the configured grant in the first action. Here, FIG. 6 illustrates an action in the case that the interval value of the Semi-Persistent Scheduling is configured to be "1 (1 subframe)".

As illustrated in FIG. 6, the terminal device 1 may receive the DCI which is used to indicate the activation and/or reactivation of the Semi-Persistent Scheduling. The terminal device 1 may perform the non-empty transmission on the Semi-Persistent Scheduling resource. To be more specific, the terminal device 1 may perform the non-empty transmission based on the configured uplink grant according to Equation (1) described above. The terminal device 1 may perform the empty transmission on the Semi-Persistent Scheduling resource. To be more specific, the terminal device 1 may perform the empty transmission on the Semi-Persistent Scheduling resource in the case of no available data for transmission.

Here, the terminal device 1 may clear the configured grant in a case that the number of consecutive empty transmissions on the Semi-Persistent Scheduling resource reaches the value configured by using the third parameter (the number of transmissions). The terminal device 1 may release the uplink resource (Semi-Persistent Scheduling resource) in the case that the number of consecutive empty transmissions on the Semi-Persistent Scheduling resource reaches the value configured by using the third parameter (the number of transmissions). Specifically, the terminal device 1 may clear the configured grant and/or release the uplink resource, based on the third parameter.

Figure 7:
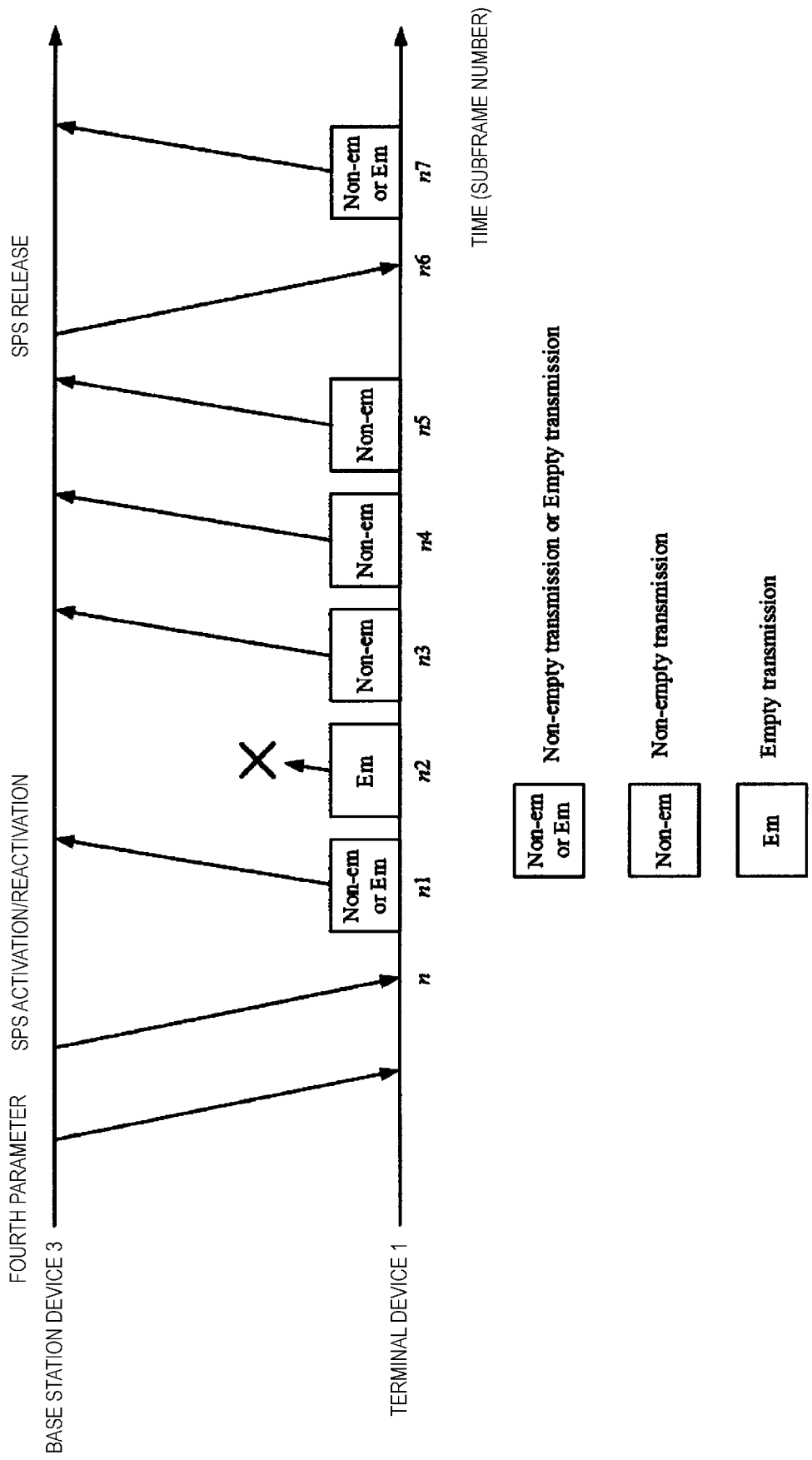
FIG. 7 is a diagram illustrating another example of the uplink data transmission method according to the present embodiment.

FIG. 7 is a diagram for describing an uplink data transmission method according to the present embodiment. The uplink data transmission method described with reference to FIG. 7 may be applied to the base station device 3 and/or terminal device 1 described above. Hereinafter, a behavior described with reference to FIG. 7 is also referred to as a second behavior. FIG. 7 illustrates a behavior in the case that the interval value of the Semi-Persistent Scheduling is configured to be "1 (1 subframe)". The transmission illustrated in FIG. 7 represents the transmission on the Semi-Persistent Scheduling resource.

As illustrated in FIG. 7, the base station device 3 may transmit the fourth parameter to the terminal device 1. For example, the base station device 3 may transmit the fourth parameter by using higher layer signaling (e.g., RRC layer signaling). For example, the fourth parameter may include a parameter used to configure to perform the second behavior (which may be a partial behavior included in the second behavior). The fourth parameter may include a parameter used to configure the interval value of the uplink Semi-Persistent Scheduling "1 (1 subframe)".

The fourth parameter may include a parameter used to configure a first timer (also referred to as a SPS deactivation timer) described later. The fourth parameter may include a parameter used to configure a second timer (also referred to as a SPS prohibit timer) described later. The fourth parameter may include a parameter used to configure a subframe for which the transmission corresponding to the Semi-Persistent Scheduling is not performed (that is, a subframe for which the transmission corresponding to the Semi-Persistent Scheduling is not permitted to be performed) described later.

The fourth parameter may include a parameter used to configure whether the empty transmission is performed on the Semi-Persistent Scheduling resource (configure to perform or not to perform the transmission).

To be more specific, the terminal device 1 may switch between the first behavior and the second behavior, based on the fourth parameter transmitted by the base station device 3 (e.g., a parameter in the higher layer or a parameter in the RRC layer). For example, the terminal device 1 may perform the first behavior in a case of not being configured with the fourth parameter, and perform the second behavior in a case of being configured with the fourth parameter.

In a subframe n, the terminal device 1 receives the DCI (the DCI format, the uplink grant) which is used to indicate the activation and/or reactivation of the Semi-Persistent Scheduling. Here, the terminal device 1 may perform the non-empty transmission or the empty transmission in a subframe corresponding to the subframe in which the DCI used to indicate the activation and/or reactivation of the Semi-Persistent Scheduling is received (e.g., a subframe 4 subframes after the subframe n, that is, a subframe n1).

Specifically, in the subframe n1, the terminal device 1 having available data for transmission may perform the non-empty transmission. Here, in a case that the terminal device 1 is given an uplink grant size that is equal to or larger than predetermined bytes (e.g., 4 bytes) and has available data for transmission, the terminal device 1 may perform the non-empty transmission. In other words, for example, the terminal device 1 having available data for transmission in the subframe n1 does not perform the transmission of only the padding BSR and/or padding.

In the subframe n1, the terminal device 1 not having available data for transmission may perform the empty transmission. Here, in a case that the terminal device 1 is given a DCI format (e.g., uplink grant) the size of which is smaller than predetermined bytes (e.g., 7 bytes) and does not have available data for transmission, the terminal device 1 may perform the empty transmission.

A subframe n2 represents a subframe in which the terminal device 1 does not have available data for transmission. Here, in the subframe n2, the terminal device 1 not having available data for transmission does not perform the empty transmission.

In other words, the terminal device 1 configured with the fourth parameter does not perform the empty transmission in a case of not having available data for transmission. As described above, the terminal device 1 not configured with the fourth parameter performs the empty transmission in the case of not having available data for transmission. To be more specific, the terminal device 1 may switch between whether to perform the empty transmission, based on the fourth parameter, in the case of not having available data for transmission.

Here, in the subframe n2, the terminal device 1 may always perform the non-empty transmission or the empty transmission in a case of transmission corresponding to the DCI (the DCI format, the uplink grant) to which the CRC parity bits scrambled with the C-RNTI are attached. In other words, in a case that a PUSCH resource is scheduled by using the DCI to which the CRC parity bits scrambled with the C-RNTI are attached, the terminal device 1 may always perform the non-empty transmission or the empty transmission on the scheduled PUSCH resource.

To be more specific, a resource scheduled by using the DCI to which the CRC parity bits scrambled with the C-RNTI are attached (dynamically scheduled resource) may override a resource scheduled by using the DCI to which the CRC parity bits scrambled with the SPS C-RNTI are attached (semi-permanently scheduled resource).

Here, the scheduled PUSCH resource may be a resource of a serving cell including the Semi-Persistent Scheduling resource. The scheduled PUSCH resource may be a resource of a serving cell other than the serving cell including the Semi-Persistent Scheduling resource. Specifically, the scheduled PUSCH resource may be a resource of a serving cell including the Semi-Persistent Scheduling resource, or a resource of a serving cell other than the serving cell including the Semi-Persistent Scheduling resource.

Specifically, the terminal device 1 which is configured with the fourth parameter, has the available data for transmission, and is given the uplink grant corresponding to the Semi-Persistent Scheduling may perform the non-empty transmission. Here, the terminal device 1 may perform the non-empty transmission only in a case that the size of the uplink grant corresponding to the Semi-Persistent Scheduling is equal to or larger than predetermined bytes (e.g., 4 bytes).

The terminal device 1 which is configured with the fourth parameter, does not have the available data for transmission, and is given the uplink grant corresponding to the Semi-Persistent Scheduling does not perform the empty transmission. Here, the terminal device 1 may not perform the empty transmission only in a case that the size of the uplink grant corresponding to the Semi-Persistent Scheduling is smaller than predetermined bytes (e.g., 7 bytes).

The terminal device 1 which has the available data for transmission and is given the uplink grant corresponding to the dynamic scheduling may perform the non-empty transmission regardless of being configured with the fourth parameter. Here, the terminal device 1 may perform the non-empty transmission only in a case that the size of the uplink grant corresponding to the dynamic scheduling is equal to or larger than predetermined bytes (e.g., 4 bytes).

The terminal device 1 which does not have the available data for transmission and is given the uplink grant corresponding to the dynamic scheduling may perform the empty transmission regardless of being configured with the fourth parameter. Here, the terminal device 1 may perform the empty transmission only in the case that the size of the uplink grant corresponding to the dynamic scheduling is smaller than predetermined bytes (e.g., 7 bytes).

Each of a subframe n3, a subframe n4, and a subframe n5 represents a subframe in which the terminal device 1 has available data for transmission. In the subframe n3, subframe n4, and subframe n5, the terminal device 1 having available data for transmission may perform the non-empty transmission.

In a subframe n6, the terminal device 1 receives the DCI (the DCI format, the uplink grant) which is used to indicate the release of the Semi-Persistent Scheduling. Here, the terminal device 1 may perform the non-empty transmission or the empty transmission in a subframe corresponding to the subframe in which the DCI used to indicate the release of the Semi-Persistent Scheduling is received (e.g., a subframe 4 subframes after the subframe n6, that is, a subframe n7).

Here, the terminal device 1 may perform the non-empty transmission or the empty transmission on the PUSCH (PUSCH resource) scheduled using the most recent DCI which is used to indicate the activation and/or deactivation of the Semi-Persistent Scheduling in the case of receiving the DCI which is used to indicate the release of the Semi-Persistent Scheduling. In other words, the terminal device 1 may perform the non-empty transmission or the empty transmission on the PUSCH (PUSCH resource) scheduled by using the configured grant which is stored.

As described above, the field associated with the resource block assignment (resource allocation) in the DCI which is used to indicate that the release of the Semi-Persistent Scheduling may be set to a value defined in advance for the release of the Semi-Persistent Scheduling. Therefore, the terminal device 1 may perform the non-empty transmission or the empty transmission, based on the configured grant in the case of receiving the DCI which is used to indicate the release of the Semi-Persistent Scheduling.

To be more specific, in the subframe n7, the terminal device 1 having available data for transmission may perform the non-empty transmission based on the configured grant. Here, in the case that the terminal device 1 is given an uplink grant size that is equal to or larger than predetermined bytes (e.g., 4 bytes) and has available data for transmission, the terminal device 1 may perform the non-empty transmission based on the configured grant. In other words, for example, in the subframe n7, the terminal device 1 having available data for transmission does not perform the transmission of only the padding BSR and/or padding.

In the subframe n7, the terminal device 1 not having available data for transmission may perform the empty transmission based on the configured grant. Here, in the case that the terminal device 1 is given a DCI format (e.g., uplink grant) the size of which is smaller than predetermined bytes (e.g., 7 bytes) and does not have available data for transmission, the terminal device 1 may perform the empty transmission based on the configured grant.

The terminal device 1 may clear the configured grant and/or release the uplink resource in a subframe in which the non-empty transmission or empty transmission is performed or in subframes after the subframe. That is, the terminal device 1 configured with the fourth parameter may perform the non-empty transmission or empty transmission in the case of receiving the DCI which is used to indicate the release of the Semi-Persistent Scheduling, and may clear the configured grant and/or release the uplink resource in a subframe in which the non-empty transmission or empty transmission is performed or in subframes after the subframe.

The terminal device 1 may clear the configured grant and/or release the uplink resource in subframe in which the DCI used to indicate the release of the Semi-Persistent Scheduling is received or in subframes after the subframe. That is, the terminal device 1 configured with the fourth parameter, in the case of receiving the DCI which is used to indicate the release of the Semi-Persistent Scheduling, may deliver the configured grant to the HARQ entity, and thereafter, may clear the configured grant and/or release the uplink resource in a subframe in which the DCI used to indicate the release of the Semi-Persistent Scheduling is received or in subframes after the subframe.

As describe above, the terminal device 1 not configured with the fourth parameter clears the configured grant and/or releases the uplink resource without transmitting any information to the base station 3 in the case of receiving the DCI which is used to indicate the release of the Semi-Persistent Scheduling. That is, the terminal device 1 may perform the non-empty transmission or empty transmission in the case of receiving the DCI which is used to indicate the release of the Semi-Persistent Scheduling, based on the fourth parameter, and thereafter, may switch between whether to clear the configured grant and/or release the uplink resource, or to clear the configured grant and/or release the uplink resource without transmitting any information to the base station 3.

As described above, the terminal device 1 not having available data for transmission does not perform the empty transmission. To be more specific, not performing the empty transmission may be defined as the behavior (processing) in the HARQ entity in the terminal device 1. In other words, performing the non-empty transmission, not performing the non-empty transmission, performing the empty transmission, and/or not performing the empty transmission may be defined as the behavior (processing) in the HARQ entity.

For example, it may be defined that after the HARQ entity obtains the MAC Protocol Data Unit (MAC PDU) to transmit from the first entity, the HARQ process is not instructed to trigger the new transmission (an initial transmission) (the initial transmission is not triggered).

Specifically, the first entity may provide the MAC protocol data unit to transmit. A Logical Channel Prioritization procedure in a case that the new transmission is performed may be applied to the first entity. The first entity may multiplex the MAC control elements and the MAC service data units.

Not performing the empty transmission may be defined as the behavior (processing) in the HARQ process in the terminal device 1. In other words, performing the non-empty transmission, not performing the non-empty transmission, performing the empty transmission, and/or not performing the empty transmission may be defined as the behavior (processing) in the HARQ process.

For example, it may be defined that the HARQ process does not instruct a physical layer to generate the transmission according to the stored uplink grant.

Not performing the empty transmission may be defined as the behavior (processing) in the first entity. In other words, performing the non-empty transmission, not performing the non-empty transmission, performing the empty transmission, and/or not performing the empty transmission may be defined as the behavior (processing) in the first entity. Here, the behavior (processing) in the first entity may be the behavior (processing) of the MAC entity in a procedure relating to "Multiplexing and assembly".

Here, the first entity, in a case of having available data for transmission, may generate the MAC protocol data unit including the MAC service data unit. The first entity, in a case of not having available data for transmission, may generate the MAC protocol data unit not including the MAC service data unit.

The first entity, in a case that the Regular BSR is triggered, may generate the MAC protocol data unit including the Buffer Status Report MAC CE including the Regular BSR. The first entity, in a case that the Periodic BSR is triggered, may generate the MAC protocol data unit including the Buffer Status Report MAC CE including the Periodic BSR.

In a case that the empty transmission is not performed, the first entity may not generate the MAC protocol data unit corresponding to the empty transmission. In the case that the empty transmission is not performed, the first entity may not deliver the MAC protocol data unit corresponding to the empty transmission to the HARQ entity.

Here, in the case that the empty transmission is not performed, the HARQ entity may not deliver the MAC protocol data unit corresponding to the empty transmission to the HARQ process. In the case that the empty transmission is not performed, the HARQ process may not deliver the MAC protocol data unit corresponding to the empty transmission to the physical layer.

For example, it may be defined that in a case the MAC entity is configured with the fourth parameter, has available data for transmission, and given the uplink grant corresponding to the Semi-Persistent Scheduling, the MAC entity transmits the MAC protocol data unit including one or multiple MAC service data units. Here, as described above, the MAC entity may transmit the MAC protocol data unit only in the case that the size of the uplink grant corresponding to the Semi-Persistent Scheduling is equal to or larger than predetermined bytes (e.g., 4 bytes).

It may be also defined that in the case the MAC entity is configured with the fourth parameter, has available data for transmission, and is given the uplink grant corresponding to the Semi-Persistent Scheduling, the MAC entity transmits the MAC protocol data unit including one or multiple first MAC control elements. Here, as described above, the MAC entity may transmit the MAC protocol data unit only in the case that the size of the uplink grant corresponding to the Semi-Persistent Scheduling is equal to or larger than predetermined bytes (e.g., 4 bytes).

That is, it may be defined that in the case the MAC entity is configured with the fourth parameter, has available data for transmission, and is given the uplink grant corresponding to the Semi-Persistent Scheduling, the MAC entity transmits the MAC protocol data unit including one or multiple MAC service data units and/or one or multiple first MAC control elements.

It may be defined that in the case the MAC entity is configured with the fourth parameter, has available data for transmission, and is given the uplink grant corresponding to the Semi-Persistent Scheduling, the MAC entity does not transmit the MAC protocol data unit including only padding. Here, as described above, the MAC entity may transmit the MAC protocol data unit in the case that the size of the uplink grant corresponding to the Semi-Persistent Scheduling is smaller than predetermined bytes (e.g., 7 bytes).

It may be defined that in the case the MAC entity is configured with the fourth parameter, has available data for transmission, and is given the uplink grant corresponding to the Semi-Persistent Scheduling, the MAC entity does not transmit the MAC protocol data unit including one or multiple second MAC control elements. Here, as described above, the MAC entity may transmit the MAC protocol data unit in the case that the size of the uplink grant corresponding to the Semi-Persistent Scheduling is smaller than predetermined bytes (e.g., 7 bytes).

It may be defined that in the case the MAC entity is configured with the fourth parameter, has available data for transmission, and is given the uplink grant corresponding to the Semi-Persistent Scheduling, the MAC entity does not transmit the MAC protocol data unit including only padding and/or one or multiple second MAC control elements.

The base station device 3 may transmit a parameter used to configure an uplink subframe for which the transmission corresponding to the Semi-Persistent Scheduling is not performed (that is, an uplink subframe for which the transmission corresponding to the Semi-Persistent Scheduling is not permitted to be performed). For example, the base station device 3 may transmit the parameter used to configure an uplink subframe for which the transmission corresponding to the Semi-Persistent Scheduling is not performed, by using higher layer signaling (RRC layer signaling).

For example, the uplink subframe for which the transmission corresponding to the Semi-Persistent Scheduling is not performed may be configured by use of a bitmap method, where an uplink subframe for which the transmission corresponding to the Semi-Persistent Scheduling is permitted to be performed may be expressed by "0", and an uplink subframe for which the transmission corresponding to the Semi-Persistent Scheduling is not permitted to be performed may be expressed by "1".

The terminal device 1 does not perform uplink transmission in the uplink subframe for which the transmission corresponding to the Semi-Persistent Scheduling is not permitted to be performed. To be more specific, even in a case that the terminal device 1 has available data for transmission (even in a case that the non-empty transmission occurs), the terminal device 1 does not perform the uplink transmission in the uplink subframe for which the transmission corresponding to the Semi-Persistent Scheduling is not permitted to be performed. In other words, the terminal device 1 may perform uplink transmission only in an uplink subframe for which the transmission corresponding to the Semi-Persistent Scheduling is permitted to be performed.

Figure 8:
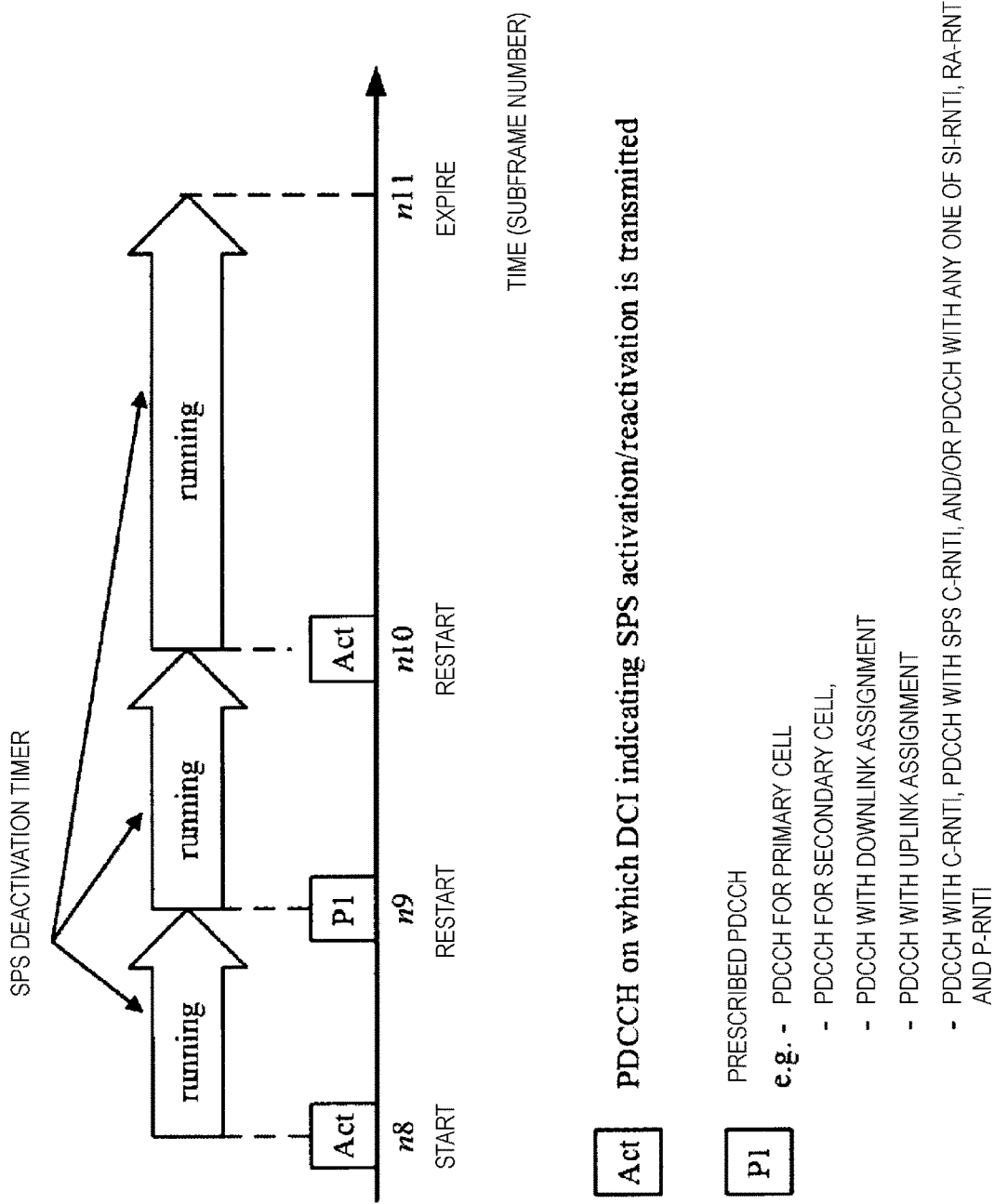
FIG. 8 is a diagram illustrating another example of the uplink data transmission method according to the present embodiment.

FIG. 8 is a diagram for describing an uplink data transmission method according to the present embodiment. The uplink data transmission method described with reference to FIG. 8 may be applied to the base station device 3 and/or the terminal device 1 described above. Here, a behavior described with reference to FIG. 8 is included in the second behavior. As described above, the terminal device 1 may switch between the first behavior and the second behavior, based on the fourth parameter transmitted by the base station device 3.

FIG. 8 illustrates that the terminal device 1 receives, in a subframe n8 and a subframe n10, the DCI (the DCI format, the uplink grant) which is used to indicate the activation and/or reactivation of the Semi-Persistent Scheduling on the PDCCH. FIG. 8 also illustrates that the terminal device 1 receives, in a subframe n9, predetermined information of the PDCCH (predetermined PDCCH).

Here, as illustrated in FIG. 8, the terminal device 1 may start the first timer (also referred to as the SPS deactivation timer), based on the reception of the DCI which is used to indicate the activation and/or reactivation of the Semi-Persistent Scheduling in the subframe n. To be more specific, the terminal device 1 may start the first timer in a subframe in which the DCI used to indicate the activation and/or reactivation of the Semi-Persistent Scheduling is received or in subframes after the subframe.

The terminal device 1 may start the first timer in a subframe in which transmission corresponding to the DCI used to indicate the activation and/or reactivation of the Semi-Persistent Scheduling is performed or in subframes after the subframe. For example, the terminal device 1 may perform the non-empty transmission or empty transmission in a subframe corresponding to the subframe in which the DCI used to indicate the activation and/or reactivation of the Semi-Persistent Scheduling is received (e.g., a subframe that is 4 subframes after the subframe n8), and may start the first timer in a subframe in which the non-empty transmission or empty transmission is performed or in subframes after the subframe.

The base station device 3 may transmit a parameter used to configure the first timer (a first timer value) to the terminal device 1. For example, the base station device may transmit the parameter used to configure the first timer (the first timer value) by using higher layer signaling (e.g., RRC layer signaling). The terminal device 1 may set the first timer (the first timer value), based on the parameter transmitted by the base station device 3.

The terminal device 1 may restart the first timer based on the reception of predetermined information in the subframe n9. For example, the terminal device 1 may restart the first timer in a subframe in which the predetermined information is received or in subframes after the subframe. Here, the terminal device 1 may restart the first timer in a subframe in which transmission corresponding to the predetermined information is performed or in subframes after the subframe. The terminal device 1 may restart the first timer in a subframe in which reception corresponding to the predetermined information is performed or in subframes after the subframe.

Here, whether to restart the first timer depending on what type of the predetermined information the terminal device 1 receives in the subframe n9 may be defined in advance by specifications or the like, and the information may be known to both the base station device 3 and the terminal device 1.

For example, the predetermined information may satisfy some or all of (i) to (vii) below. (i) The predetermined information may be the DCI for primary cell.

(ii) The predetermined information may be the DCI for secondary cell.

(iii) The predetermined information may be the downlink DCI format (the DCI for downlink, the downlink assignment).

(iv) The predetermined information may be the uplink DCI format (the DCI for uplink, the uplink grant).

(v) The predetermined information may be the DCI to which the CRC parity bits scrambled with the C-RNTI are attached.

(vi) The predetermined information may be the DCI to which the CRC parity bits scrambled with the SPS C-RNTI are attached.

(vii) The predetermined information may be the DCI to which the CRC parity bits scrambled with any one of the SI-RNTI, RA-RNTI, and P-RNTI are attached.

Here, for example, the predetermined information satisfying above (i), (iv), and (v) may be the DCI for uplink for the primary cell to which the CRC parity bits scrambled with the C-RNTI are attached.

The terminal device 1 may restart the first timer, based on the reception of the DCI which is used to indicate the activation and/or reactivation of the Semi-Persistent Scheduling in the subframe n10. For example, the terminal device 1 may restart the first timer in a subframe in which the DCI used to indicate the activation and/or reactivation of the Semi-Persistent Scheduling is received or in subframes after the subframe.

The terminal device 1 may restart the first timer in a subframe in which the transmission corresponding to the DCI used to indicate the activation and/or reactivation of the Semi-Persistent Scheduling (e.g., non-empty transmission or empty transmission) is performed or in subframes after the subframe.

A subframe n11 represents a subframe in which the first timer expires. The terminal device 1 may clear the configured grant in a case that the first timer expires. The terminal device 1 may release (clear) the uplink resource allocated by the base station device 3 (Semi-Persistent Scheduling resource, PUSCH resource) in the case that the first timer expires. The terminal device 1 may stop the first timer in the case that the first timer expires.

To be more specific, the terminal device 1 may maintain the first timer, and deactivate the associated transmissions, based on the expiration of the first timer. In other words, the first timer may be used to deactivate the transmission corresponding to the Semi-Persistent Scheduling. Specifically, the terminal device 1 may perform the non-empty transmission on the Semi-Persistent Scheduling resource while the first timer is running. The terminal device 1 does not perform the empty transmission on the Semi-Persistent Scheduling resource (also referred to as a second empty transmission) while the first timer is running.

Here, the first timer may be indicated as a counter. For example, the first timer may be indicated as a counter for the number of times of occurrences of the configured grant (the number of occurrences of the configured grant).

Specifically, the terminal device 1 may clear the configured grant in a case that the counter (the first timer) reaches a predetermined value. The terminal device 1 may release (clear) the uplink resource allocated by the base station device 3 (Semi-Persistent Scheduling resource, PUSCH resource) in the case that that the counter (the first timer) reaches a predetermined value. Specifically, a parameter used to configure the predetermined value may be configured by the base station device 3.

To be more specific, the terminal device 1 may restart the counter (the first timer), based on the reception of predetermined information in the subframe n9. For example, the terminal device 1 may reset the counter (the first timer) in a subframe in which the predetermined information is received or in subframes after the subframe. Here, the terminal device 1 may reset the counter (the first timer) in a subframe in which the transmission corresponding to the predetermined information is performed or in subframes after the subframe. The terminal device 1 may reset the counter (the first timer) in a subframe in which the reception corresponding to the predetermined information is performed or in subframes after the subframe.

The terminal device 1 may reset the counter (the first timer), based on the reception of the DCI which is used to indicate the activation and/or reactivation of the Semi-Persistent Scheduling in the subframe n10. For example, the terminal device 1 may reset the counter (the first timer) in a subframe in which the DCI used to indicate the activation and/or reactivation of the Semi-Persistent Scheduling is received or in subframes after the subframe.

The terminal device 1 may reset the counter (the first timer) in a subframe in which the transmission corresponding to the DCI used to indicate the activation and/or reactivation of the Semi-Persistent Scheduling (e.g., non-empty transmission or empty transmission) is performed or in subframes after the subframe.

As described above, the terminal device 1 not configured with the fourth parameter may clear the configured grant and/or release the uplink resource, based on the third parameter (parameter for indicating the Number of empty transmissions before release). The terminal device 1 configured with the fourth parameter may clear the configured grant and/or release the uplink resource, based on the first timer (SPS deactivation timer).

That is, the terminal device 1 may switch between whether to clear the configured grant and/or release the uplink resource according to the third parameter, or to clear the configured grant and/or release the uplink resource according to the parameter used to configure the first timer, based on whether being configured with the fourth parameter.

Figure 9:
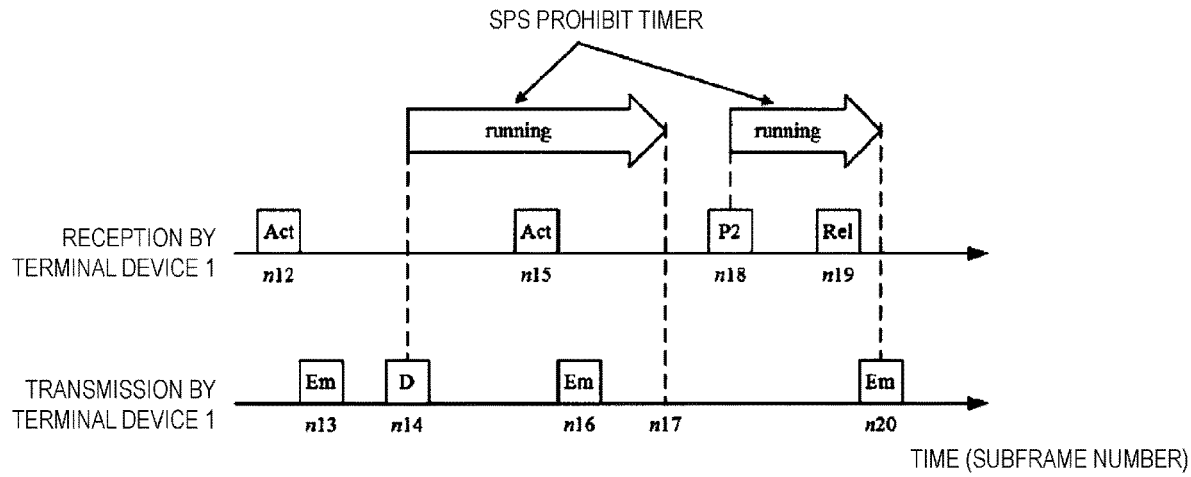
FIG. 9 is a diagram illustrating another example of the uplink data transmission method according to the present embodiment.

FIG. 9 is a diagram for describing an uplink data transmission method according to the present embodiment. The uplink data transmission method described with reference to FIG. 9 may be applied to the base station device 3 and/or terminal device 1 described above. Here, a behavior described with reference to FIG. 9 is included in the second. As described above, the terminal device 1 may switch between the first behavior and the second behavior, based on the fourth parameter transmitted by the base station device 3.

FIG. 9 illustrates that the terminal device 1 receives, in a subframe n12 and a subframe n15, the DCI (the DCI format, the uplink grant) which is used to indicate the activation and/or reactivation of the Semi-Persistent Scheduling on the PDCCH. FIG. 9 also illustrates that the terminal device 1 receives, in a subframe n18, predetermined information of the PDCCH (predetermined PDCCH). FIG. 9 also illustrates that the terminal device 1 receives, in a subframe n19, the DCI which is used to indicate the release of the Semi-Persistent Scheduling (the DCI format, the uplink grant) on the PDCCH. Here, the predetermined information in FIG. 9 may be different from the predetermined information in FIG. 8.

Here, each of a subframe n13 and a subframe n16 represents a subframe in which the empty transmission occurs. As described above, the terminal device 1 does not perform the empty transmission in the subframe n13. A subframe n14 represents a subframe in which the non-empty transmission occurs. As described above, the terminal device 1 performs the non-empty transmission in the subframe n14.

Here, the terminal device 1 performing the non-empty transmission in the subframe n14 may start the second timer (also referred to as the SPS prohibit timer). In other words, the terminal device 1 may start the second timer in a subframe in which the non-empty transmission is performed or in subframes after the subframe. The terminal device 1 may maintain the second timer, and prohibit (stop) associated transmissions while the second timer is running. In other words, the second timer may be used to prohibit the transmission corresponding to the Semi-Persistent Scheduling. Here, the second timer may not prohibit the transmission corresponding to the dynamically scheduled resource.

Here, the base station device 3 may transmit a parameter used to configure the second timer (a second timer value) to the terminal device 1. For example, the base station device may transmit the parameter used to configure the second timer (the second timer value) by using higher layer signaling (e.g., RRC layer signaling). The terminal device 1 may set the second timer (the second timer value), based on the parameter transmitted by the base station device 3.

A subframe n17 represents a subframe in which the second timer expires. The terminal device 1 may restart associated transmissions in a case that the second timer expires. For example, the terminal device 1 may perform the non-empty transmission.

The terminal device 1 may start the second timer, based on the reception of predetermined information in the subframe n18. Specifically, the terminal device 1 may start the second timer in a subframe in which the prescribed information is received or in subframes after the subframe. The terminal device 1 may restart the second timer in a subframe in which transmission corresponding to the predetermined information is performed or in subframes after the subframe. The terminal device 1 may restart the second timer in a subframe in which reception corresponding to the predetermined information is performed or in subframes after the subframe.

Here, whether to restart the second timer depending on what type of the predetermined information the terminal device 1 receives in the subframe n18 may be defined in advance by specifications or the like, and the information may be known to both the base station device 3 and the terminal device 1.

For example, the predetermined information may satisfy some or all of (i) to (vii) described above. (i) The predetermined information may be the DCI for primary cell.

(ii) The predetermined information may be the DCI for secondary cell.

(iii) The predetermined information may be the downlink DCI format (the DCI for downlink, the downlink assignment).

(iv) The predetermined information may be the uplink DCI format (the DCI for the uplink, the uplink grant).

(v) The predetermined information may be the DCI to which the CRC parity bits scrambled with the C-RNTI are attached.

(vi) The predetermined information may be the DCI to which the CRC parity bits scrambled with the SPS C-RNTI are attached.

(vii) The predetermined information may be the DCI to which the CRC parity bits scrambled with any one of the SI-RNTI, RA-RNTI, and P-RNTI are attached.

Here, for example, the predetermined information satisfying above (i), (iv), and (v) may be the DCI for the uplink for the primary cell to which the CRC parity bits scrambled with the C-RNTI are attached.

As described above, the terminal device 1 receiving the DCI which is used to indicate the activation and/or reactivation of the Semi-Persistent Scheduling in the subframe n12 and subframe n15 may perform the non-empty transmission or the empty transmission in corresponding subframes (e.g., a subframe 4 subframes after the subframe n12 (subframe n13), and a subframe 4 subframes after the subframe n15 (subframe n16)).

Here, the terminal device 1 may not start the second timer in a case of performing the empty transmission in the corresponding subframe. The terminal device 1 may start the second timer in a case of performing the non-empty transmission in the corresponding subframe. Specifically, the terminal device 1 may switch between whether to start the second timer, based on which of the empty transmission and the non-empty transmission is performed in the case of receiving the DCI which is used to indicate the activation and/or reactivation of the Semi-Persistent Scheduling.

The terminal device 1 may start the second timer in a case of performing the non-empty transmission or the empty transmission in the corresponding subframe. Specifically, the terminal device 1 may always start the second timer in the case of performing the empty transmission or the non-empty transmission depending on the DCI which is used to indicate the activation and/or reactivation of the Semi-Persistent Scheduling.

Here, as is described as the behavior in the subframe n16, the terminal device 1 may perform the empty transmission or the non-empty transmission depending on the DCI which is used to indicate the activation and/or reactivation of the Semi-Persistent Scheduling, even while the second timer is running. The terminal device 1 may perform the empty transmission or the non-empty transmission depending on the DCI which is used to indicate the activation and/or reactivation of the Semi-Persistent Scheduling, and restart the second timer, even while the second timer is running.

The terminal device 1 receiving the DCI which is used to indicate the release of the Semi-Persistent Scheduling in the subframe n19 may perform the non-empty transmission or the empty transmission in corresponding subframes (e.g., a subframe 4 subframes after the subframe n19 (subframe n20)).

Here, as is described as the action in the subframe n16, the terminal device 1 may perform the empty transmission or the non-empty transmission depending on the DCI which is used to indicate the release of the Semi-Persistent Scheduling, even while the second timer is running. The terminal device 1 may perform the empty transmission or the non-empty transmission depending on the DCI which is used to indicate the release of the Semi-Persistent Scheduling, and stop the second timer, even while the second timer is running.

Here, the terminal device 1 may stop the first timer as well as stop the second timer. For example, the terminal device 1 may perform the empty transmission or the non-empty transmission depending on the DCI which is used to indicate the release of the Semi-Persistent Scheduling, and stop the first timer and stop the second timer, even while the second timer is running.

Figure 10:
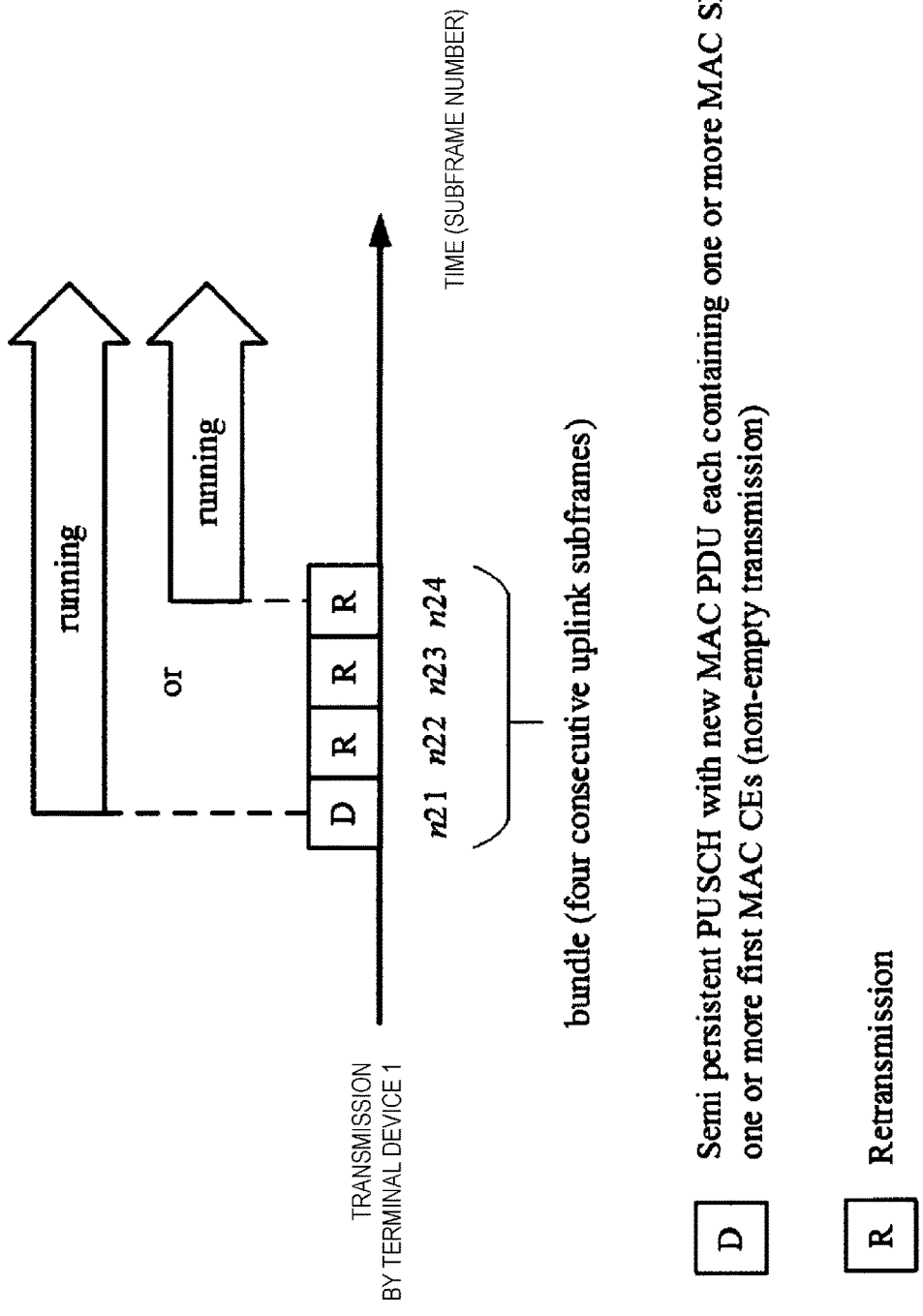
FIG. 10 is a diagram illustrating another example of the uplink data transmission method according to the present embodiment.

FIG. 10 is a diagram for describing an uplink data transmission method according to the present embodiment. The uplink data transmission method described with reference to FIG. 10 may be applied to the base station device 3 and/or terminal device 1 described above. Here, a behavior described with reference to FIG. 10 is included in the second behavior. As described above, the terminal device 1 may switch between the first behavior and the second behavior based on the fourth parameter transmitted by the base station device 3.

FIG. 10 illustrates an action in a case that a subframe bundling operation is configured for the terminal device 1 performing the second behavior. Here, the base station device 3 may use a parameter in the higher layer (also referred to as ttiBundling) to configure the subframe bundling operation. For example, in a case that the parameter in the higher layer is used to configure usage of the subframe bundling, the subframe bundling operation may be applied to only the UL-SCH. To be more specific, four consecutive uplink subframes may be used for the transmission on the UL-SCH (uplink data transmission). Here, four consecutive uplink subframes may be referred to as a bundle.

As illustrated in FIG. 10, for example, the terminal device 1 configured with the subframe bundling operation may perform the non-empty transmission in a subframe n21. The terminal device 1 may also perform re-transmission corresponding to the non-empty transmission in a subframe n22, a subframe n23, and a subframe n24. Here, the subframe n21, subframe n22, subframe n23, and subframe n24 represent the four consecutive uplink subframes.

Here, the terminal device 1 configured with the subframe bundling operation may start the first timer after performing the non-empty transmission in the subframe n21. The terminal device 1 configured with the subframe bundling operation may start the second timer after performing the non-empty transmission in the subframe n21.

Specifically, the terminal device 1 may start the first timer after the transmission in the first uplink subframe among the four consecutive uplink subframes. The terminal device 1 may start the second timer after the transmission in the first uplink subframe among the four consecutive uplink subframes.

Here, the terminal device 1, even in a case of starting the second timer after performing the non-empty transmission in the subframe n21, may not be prohibited from the uplink transmission in the other three consecutive uplink subframes. That is, the terminal device 1 configured with the subframe bundling operation, even in a case of starting the second timer in the first uplink subframe among the four consecutive uplink subframes, may not be prohibited from the uplink transmission in the other three consecutive uplink subframes (uplink subframes other than the first uplink subframe among the four consecutive subframe).

Here, the terminal device 1 configured with the subframe bundling operation may start the first timer after performing re-transmission corresponding to the non-empty transmission in the subframe n24. The terminal device 1 configured with the subframe bundling operation may start the second timer after performing re-transmission corresponding to the non-empty transmission in the subframe n24.

Specifically, the terminal device 1 may start the first timer after the transmission in the last uplink subframe among the four consecutive uplink subframes. The terminal device 1 may start the second timer after the transmission in the last uplink subframe among the four consecutive uplink subframes.

Figure 11:
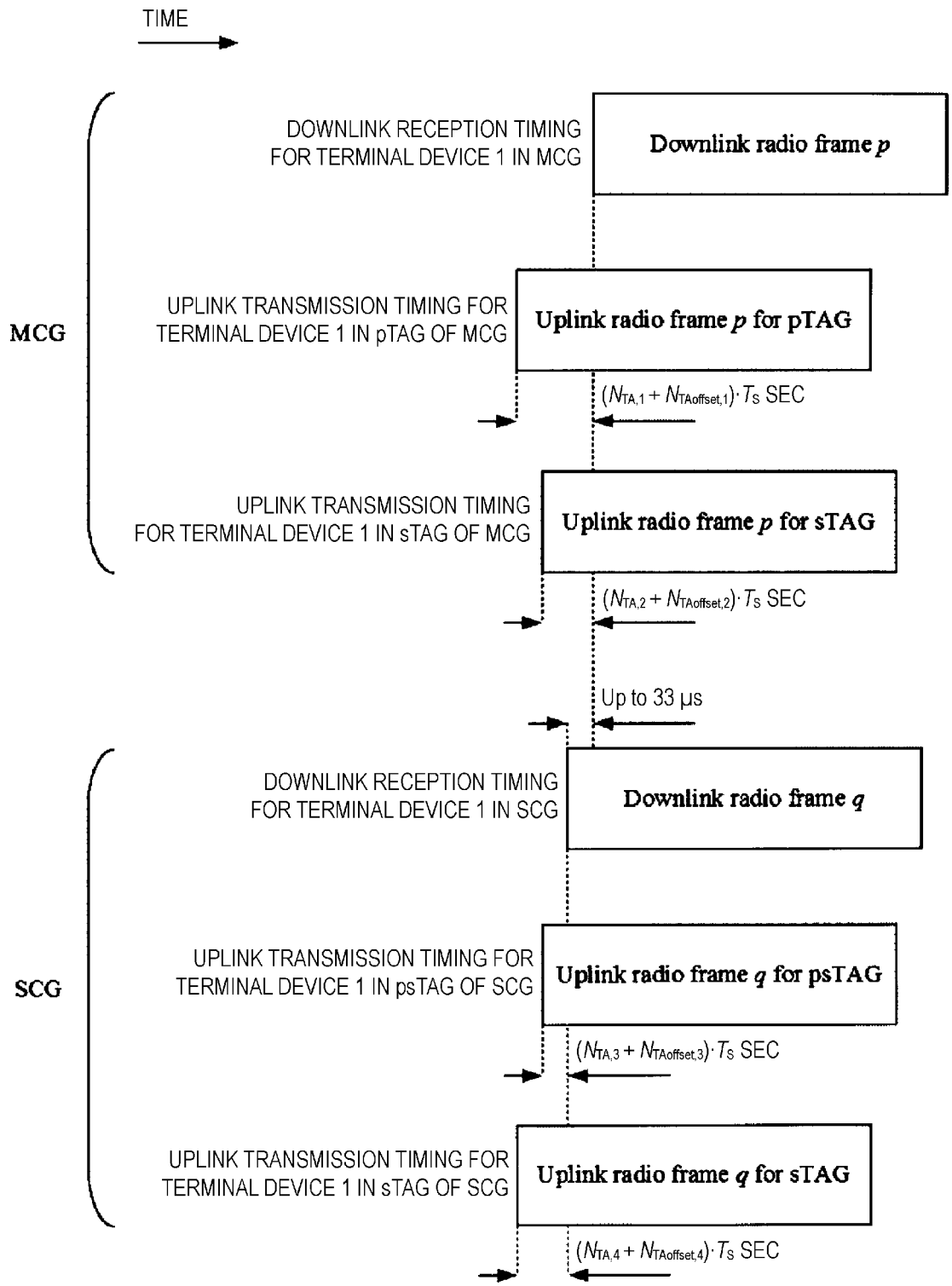
FIG. 11 is a diagram illustrating another example of the uplink data transmission method according to the present embodiment.

FIG. 11 is a diagram for describing an uplink data transmission method according to the present embodiment. The uplink data transmission method described with reference to FIG. 11 may be applied to the base station device 3 and/or terminal device 1 described above.

Here, the base station device 3 may configure a cell group (e.g., a master cell group and/or a secondary cell group) associated with a dual connectivity for the terminal device 1. For example, the base station device 3 may use the information (parameter) included in higher layer signaling to configure the cell group associated with the dual connectivity.

Here, in the dual connectivity, the master cell group may include the primary cell. In the dual connectivity, the secondary cell group may include the primary secondary cell. Here, for an operation relating to the dual connectivity, the primary cell of the master cell group and/or the primary secondary cell of the secondary cell group are also referred to as a special cell.

Here, the special cell (the primary cell of the master cell group and/or primary secondary cell of the secondary cell group in the dual connectivity) may be used for the transmission on the PUCCH. A contention based random access procedure may be performed in the special cell. To be more specific, the special cell may support the transmission on the PUCCH, and/or the contention based random access (the contention based random access procedure).

In the dual connectivity, the primary cell is not deactivated. In other words, the primary cell is always activated.

In the dual connectivity, the primary secondary cell is not deactivated. In other words, the primary secondary cell is always activated.

In the dual connectivity, the terminal device 1 may (simultaneously) connect to a Master eNB (MeNB) and a secondary eNB (SeNB, Secondary eNB). In a case that the cell group associated with the dual connectivity is configured, two MAC entities may be configured for the terminal device 1. Here, one of the two MAC entities may indicate a MAC entity for the master cell group. The other of the two MAC entities may indicate a MAC entity for the secondary cell group. In a case that the cell group associated with the dual connectivity is not configured, one MAC entity may be configured for the terminal device 1.

In other words, in the case that the cell group associated with the dual connectivity is configured, each of a first MAC entity corresponding to the master cell group and a second MAC entity corresponding to the secondary cell group may perform the associated processing in the terminal device 1.

The base station device 3 may configure a cell group associated with Timing Advance (e.g., Primary Timing Advance Group and/or Secondary Timing Advance Group) for the terminal device 1. For example, the base station device 3 may use the information (parameter) included in higher layer signaling to configure the cell group associated with the Timing Advance. Hereinafter, the cell group associated with the Timing Advance is also referred to as the Timing Advance Group (TAG).

For example, the same timing reference cell and the same Timing Advance (TA) value may be used for the cell with the configured uplink included in the same TAG.

Here, the Primary Timing Advance Group (PTAG) is a TAG including the primary cell. A timing reference cell for the PTAG is the primary cell. A Primary Secondary Timing Advance Group (PSTAG) is a TAG including the primary secondary cell. A timing reference cell for the PSTAG is the primary secondary cell.

The Secondary Timing Advance Group (STAG) is a TAG not including the primary cell, and may contain at least one serving cell with the configured uplink. Here, a timing reference cell for the STAG is any one of the secondary cells included in the STAG.

The base station device 3 may transmit a Timing Advance (TA) command for the PTAG. The base station device 3 may transmit a TA command for the STAG. Here, the TA command may be transmitted together with a TAG Identity which is used to indicate the TAG corresponding to the TA command.

The terminal device 1, in a case of receiving the TA command for the PTAG, may adjust the uplink transmission timing on the PUSCH, PUCCH, and/or SRS of the primary cell, based on the received TA command. Here, in a case that the secondary cell belongs to the PTAG, the uplink transmission timing on the PUSCH, PUCCH and/or SRS of the secondary cell may be the same as the uplink transmission timing for the primary cell.

The terminal device 1, in a case of receiving the TA command for the PSTAG, may adjust the uplink transmission timing on the PUSCH, PUCCH, and/or SRS of the primary secondary cell, based on the received TA command. Here, in a case that the secondary cell belongs to the PSTAG, the uplink transmission timing on the PUSCH, PUCCH and/or SRS of the secondary cell may be the same as the uplink transmission timing for the primary secondary cell.

The terminal device 1, in a case of receiving the TA command for the STAG, may adjust the uplink transmission timings on the PUSCH, PUCCH, and/or SRS of the all secondary cells in the STAG based on the received TA command. Here, the uplink transmission timings on the PUSCH, PUCCH and/or SRS may be the same for the all secondary cells in the STAG.

For example, the terminal device 1 may measure a reference timing, based on a downlink signal of the timing reference cell (e.g., simultaneous signal). The terminal device 1 may determine the TA for the uplink transmission, based on the TA command. The terminal device 1 may determine the uplink transmission timing, based on the measured reference timing and determined TA value.

Here, the terminal device 1 may adjust a transmission timing difference between the TAGs (PTAG, PSTAG, and/or STAG) to not exceed the maximum transmission timing difference. Here, for example, the maximum transmission timing difference may be at least 32.47 μs.

For example, the terminal device 1 may adjust the transmission timing difference between the TAGs to not exceed the maximum transmission timing difference in dual connectivity in which the master cell group and the secondary cell group are synchronized with each other.

Here, the terminal device 1 may stop adjusting in a case that the transmission timing difference between the TAGs becomes larger than the maximum transmission timing difference. Here, in a case that the transmission timing difference between the TAGs becomes larger than the maximum transmission timing difference (exceeds the maximum transmission timing difference), the terminal device 1 may consider that a third timer (also referred to as timeAlignmentTimer) as expired and may stop the uplink transmission.

For example, the base station device 3 may transmit a parameter which is used to configure the third timer. For example, the base station device may transmit the parameter used to configure the third timer by using higher layer signaling (e.g., RRC layer signaling). Here, the parameter used to configure the third timer may be transmit for each TAG. Specifically, the third timer may be configured for each TAG. To be more specific, the third timer may be configured for each of the PTAG, PSTAG, and STAG.

For example, the third timer may be used to control how long the terminal device 1 (UE) considers the serving cells belongs to the associated TAG to be uplink time aligned.

FIG. 11 illustrates a behavior in the dual connectivity in which the master cell group and the secondary cell group are synchronized with each other. Here, in the dual connectivity in which the master cell group and the secondary cell group are synchronized with each other, a difference between a downlink reception timing in the master cell group and a downlink reception timing in the secondary cell group may be 33 μs or less.

In FIG. 11, each of $(N_{TA,1}+N_{TAoffset,1}) \cdot T_S$ sec, and $(N_{TA,2}+N_{TAoffset,2}) \cdot T_S$ sec represents a difference between a downlink reception timing and uplink transmission timing in the master cell group. Each of $(N_{TA,3}+N_{TAoffset,3}) \cdot T_S$ sec, and $(N_{TA,4}+N_{TAoffset,4}) \cdot T_S$ sec represents a difference between a downlink reception timing and uplink transmission timing in the secondary cell group.

The terminal device 1 may calculate the uplink transmission timing difference between the TAGs (PTAG, PSTAG, and STAG), based on $(N_{TA,1}+N_{TAoffset,1}) \cdot T_S$ sec, $(N_{TA,2}+N_{TAoffset,2}) \cdot T_S$ sec, $(N_{TA,3}+N_{TAoffset,3}) \cdot T_S$ sec, $(N_{TA,4}+N_{TAoffset,4}) \cdot T_S$ sec, and/or 33 μs (that is the difference between the downlink reception timing in the master cell group and the downlink reception timing in the secondary cell group).

Here, each of NTA,1, NTA,2, NTA,3, and NTA,4 may be a value based on the TA command. Each of NTAoffset,1, NTAoffset,2, NTAoffset,3, and NTAoffset,4 may be a value determined based on whether the serving cell belonging to corresponding TAG is a TDD serving cell or a FDD serving cell. For example, the NTAoffset value may be "624" for TDD. The NTAoffset value may be "0" for FDD.

Here, for example, in a case that a difference between the uplink transmission timing for the PTAG of the master cell group and the uplink transmission timing for the STAG of the master cell group exceeds the maximum transmission timing difference, the terminal device 1 may consider that the third timer for the STAG of the master cell group as expired to stop the uplink transmission for the STAG of the master cell group. Specifically, the terminal device 1 may stop the transmission on the PUSCH, PUCCH, and/or SRS for the STAG of the master cell group.

In a case that a difference between the uplink transmission timing for the PTAG of the master cell group and the uplink transmission timing for the PSTAG of the secondary cell group exceeds the maximum transmission timing difference, the terminal device 1 may consider that the third timer for the PSTAG of the secondary cell group as expired to stop the uplink transmission for the PSTAG of the secondary cell group. Specifically, the terminal device 1 may stop the transmission on the PUSCH, PUCCH, and/or SRS for the PSTAG of the secondary cell group.

Here, the terminal device 1, which considers that the third timer for the PSTAG of the secondary cell group as expired, may clear the configured uplink grant. In other words, the terminal device 1 may clear the stored configured uplink grant. The terminal device 1, which considers that the third timer for the PSTAG of the secondary cell group as expired, may release (clear) the uplink resource (Semi-Persistent Scheduling resource, PUSCH resource). As described above, the Semi-Persistent Scheduling may be performed in the primary secondary cell.

The terminal device 1, which considers that the third timer for the PSTAG of the secondary cell group as expired, may consider that the third timer for the STAG of the secondary cell group as expired. Specifically, the terminal device 1 may stop the transmission on the PUSCH, PUCCH, and/or SRS for the STAG of the secondary cell group.

In a case that a difference between the uplink transmission timing for the PTAG of the master cell group and the uplink transmission timing for the STAG of the secondary cell group exceeds the maximum transmission timing difference, the terminal device 1 may consider that the third timer for the STAG of the secondary cell group as expired, and may stop the uplink transmission for the STAG of the secondary cell group. Specifically, the terminal device 1 may stop the transmission on the PUSCH, PUCCH, and/or SRS for the STAG of the secondary cell group.

In a case that a difference between the uplink transmission timing for the STAG of the master cell group and the uplink transmission timing for the PSTAG of the secondary cell group exceeds the maximum transmission timing difference, the terminal device 1 may consider that the third timer for the PSTAG of the secondary cell group as expired and may stop the uplink transmission for the PSTAG of the secondary cell group. Specifically, the terminal device 1 may stop the transmission on the PUSCH, PUCCH, and/or SRS for the PSTAG of the secondary cell group.

As described above, the terminal device 1, which considers that the third timer for the PSTAG of the secondary cell group as expired, may consider that the third timer for the STAG of the secondary cell group has expired. Specifically, the terminal device 1 may stop the transmission on the PUSCH, PUCCH, and/or SRS for the STAG of the secondary cell group.

In a case that a difference between the uplink transmission timing for the STAG of the master cell group and the uplink transmission timing for the STAG of the secondary cell group exceeds the maximum transmission timing difference, the terminal device 1 may consider that the third timer for the STAG of the secondary cell group as expired to stop the uplink transmission for the STAG of the secondary cell group. Specifically, the terminal device 1 may stop the transmission on the PUSCH, PUCCH, and/or SRS for the STAG of the secondary cell group.

In a case that a difference between the uplink transmission timing for the PSTAG of the secondary cell group and the uplink transmission timing for the STAG of the secondary cell group exceeds the maximum transmission timing difference, the terminal device 1 may consider that the third timer for the STAG of the secondary cell group as expired and may stop the uplink transmission for the STAG of the secondary cell group. Specifically, the terminal device 1 may stop the transmission on the PUSCH, PUCCH, and/or SRS for the STAG of the secondary cell group.

In other words, for example, the cell groups and/or TAGs for which the third timer is considered as expired may be prioritized. For example, as described above, a prioritization may be made such as the PTAG of the master cell group>the STAG of the master cell group>the PSTAG of the secondary cell group>the STAG of the secondary cell group. Here, how the cell groups and/or TAGs are prioritized may be defined in advance by specifications or the like. To be more specific, the prioritization of the cell groups and/or TAGs is not limited to that described above, and, of course, similar prioritization is included in the present embodiment.

As described above, the behavior described above with reference to the drawings may be limited as behavior performed only in one serving cell (e.g., only primary cell). For example, only in a case that the behavior corresponding to the Semi-Persistent Scheduling and the behavior corresponding to the dynamic scheduling are performed in one serving cell, the behavior described above may apply. In other words, for example, in a case that the behavior corresponding to the Semi-Persistent Scheduling is performed in a certain serving cell (e.g., primary cell), and the behavior corresponding to the dynamic scheduling is performed in a serving cell different from the certain serving cell (e.g., secondary cell), the behavior described above may not apply.

The behavior described above may be behavior performed for multiple serving cells (e.g., the primary cell and the secondary cell). For example, even in the case that the behavior corresponding to the Semi-Persistent Scheduling is performed in a certain serving cell (e.g., primary cell), and the behavior corresponding to the dynamic scheduling is performed in a serving cell (e.g., secondary cell) different from the certain serving cell, the behavior described above may apply.

Structures of devices according to the present embodiment will be described below.

Figure 12:
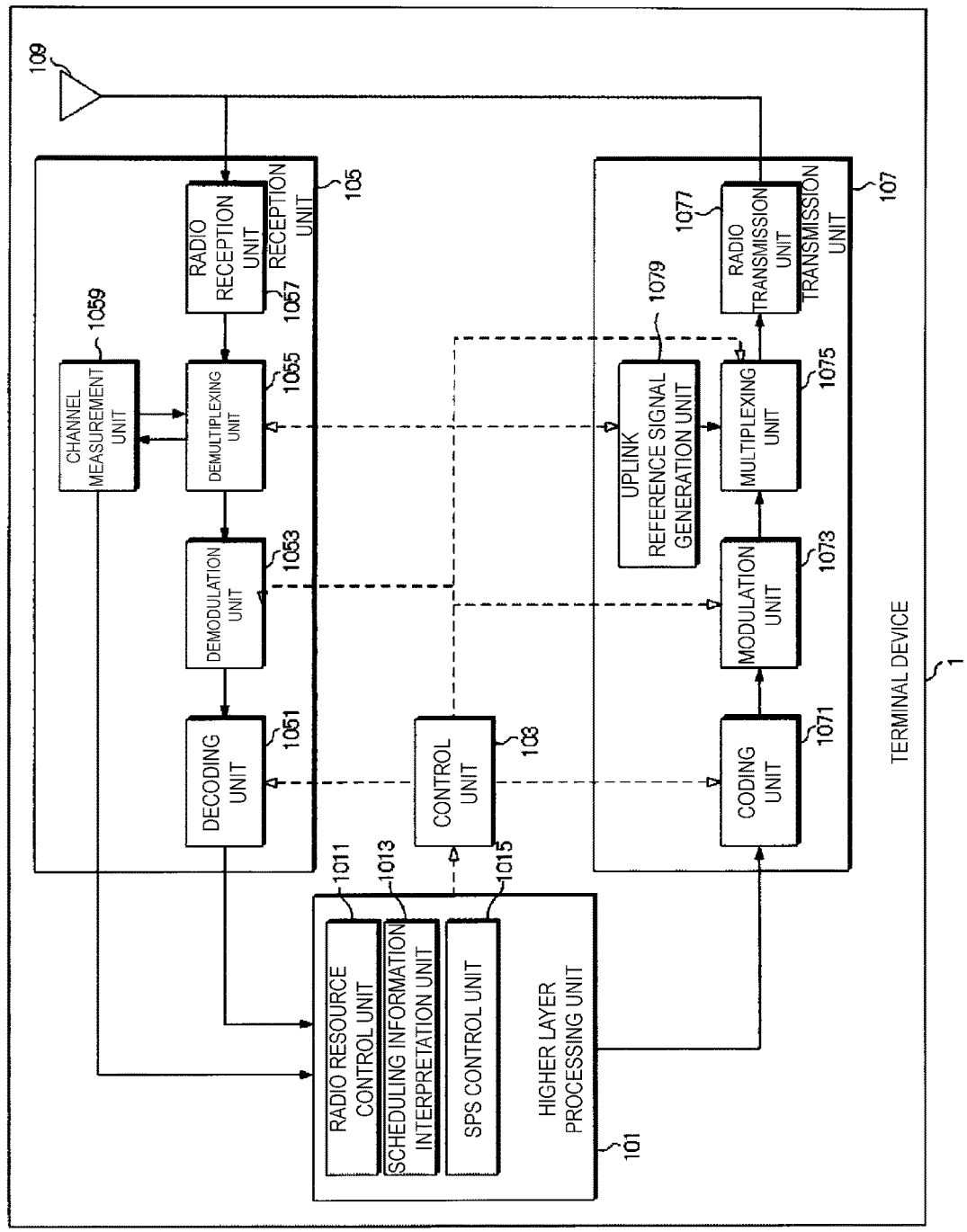
FIG. 12 is a schematic block diagram illustrating a configuration of a terminal device 1 according to the present embodiment.

FIG. 12 is a schematic block diagram illustrating a configuration of the terminal device 1 according to the present embodiment. As illustrated in FIG. 12, the terminal device 1 is configured to include a higher layer processing unit 101, a control unit 103, a reception unit 105, a transmission unit 107, and a transmit and receive antenna 109. The higher layer processing unit 101 is configured to include a radio resource control unit 1011, a scheduling information interpretation unit 1013, and a SPS control unit 1015. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various configuration information/parameters of the terminal device 1 itself. The radio resource control unit 1011 sets the various configuration information/parameters in accordance with higher layer signaling received from the base station device 3. To be more specific, the radio resource control unit 1011 sets the various configuration information/parameters in accordance with the information indicating the various configuration information/parameters received from the base station device 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The SPS control unit 1015 included in the higher layer processing unit 101 performs controls concerning the SPS, based on various configuration information, and information or conditions regarding the SPS such as parameters.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna 109, and outputs the information resulting from the decoding, to the higher layer processing unit 101.

The radio reception unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio reception unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information of a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna 109. Furthermore, the transmission unit 107 transmits uplink control information.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

The uplink reference signal generation unit 1079 generates a sequence acquired in accordance with a rule (formula) prescribed in advance, based on a physical layer cell identifier (also referred to as a Physical Cell Identity (PCI), a Cell ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 13:
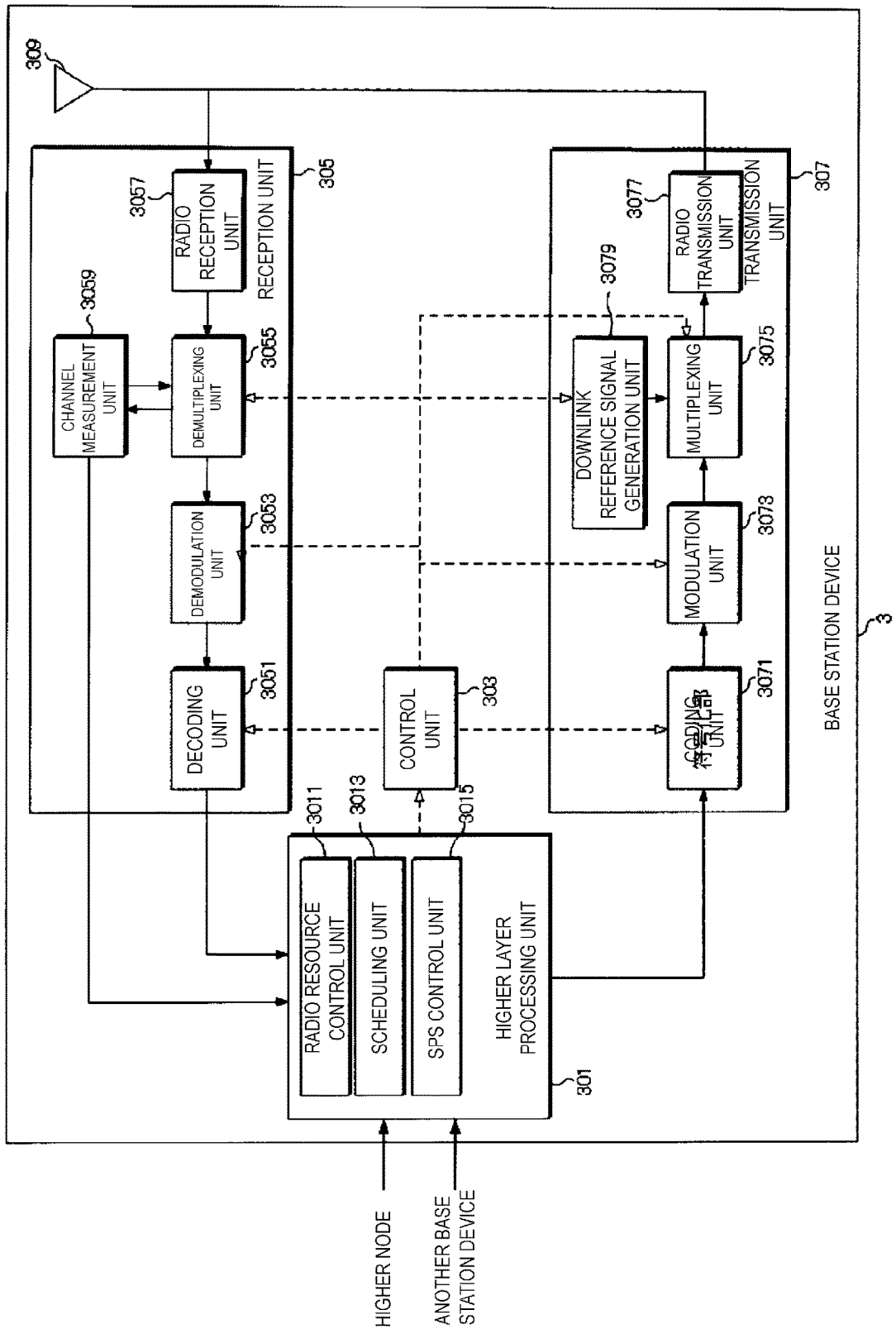
FIG. 13 is a schematic block diagram illustrating a configuration of a base station device 3 according to the present embodiment.

FIG. 13 is a schematic block diagram illustrating a configuration of the base station device 3 according to the present embodiment. As illustrated in the figure, the base station device 3 is configured to include a higher layer processing unit 301, a control unit 303, a reception unit 305, a transmission unit 307, and a transmit and receive antenna 309. The higher layer processing unit 301 is configured to include a radio resource control unit 3011, a scheduling unit 3013, and a SPS control unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmission unit 307. Furthermore, the radio resource control unit 3011 manages various configuration information/parameters for each of the terminal devices 1. The radio resource control unit 3011 may configure various configuration information/parameters for each of the terminal devices 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received channel state information and from the channel estimate, channel quality, or the like input from the channel measurement unit 3059. The scheduling unit 3013 generates the control information (e.g., the DCI format) in order to control the reception unit 305 and the transmission unit 307 in accordance with a result of the scheduling, and outputs the generated information to the control unit 303. The scheduling unit 3013 further determines timings of performing transmission processing and reception processing.

The SPS control unit 3015 included in the higher layer processing unit 301 performs controls concerning the SPS, based on various configuration information, and information or conditions regarding the SPS such as parameters.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna 309, and outputs information resulting from the decoding to the higher layer processing unit 301. The radio reception unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The reception unit 305 receives the uplink control information.

The radio reception unit 3057 removes a portion corresponding to a Cyclic Prefix (CP) from the digital signal resulting from the conversion. The radio reception unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme prescribed in advance, such as Binary Phase Shift Keying (BPSK), QPSK, 16 QAM, or 64 QAM, or in compliance with the modulation scheme that the base station device 3 itself notified in advance with the uplink grant each of the terminal devices 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal devices 1 and information designating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3 itself, and outputs the decoded uplink data and uplink control information to the higher layer processing unit 101. In a case where the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and receive antenna 309.

The coding unit 3071 codes the HARQ indicator, the downlink control information, and the downlink data that are input from the higher layer processing unit 301, in compliance with the coding scheme prescribed in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme prescribed in advance, such as BPS K, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal device 1 and that is acquired in accordance with a rule prescribed in advance, based on the Physical layer Cell Identifier (PCI) for identifying the base station device 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

To be more specific, the terminal device 1 according to the present embodiment includes the higher layer processing unit 101 configured to store the uplink grant received from the base station device as the configured uplink grant, a transmission unit 107 configured to perform the transmission of the MAC protocol data unit, based on the configured uplink grant that is considered to occur in a subframe satisfying a prescribed condition, the transmission unit 107 transmitting the MAC protocol data unit based on the configured uplink grant in response to receiving the uplink grant that is used to indicate a release of the Semi-Persistent Scheduling, and the higher layer processing unit 101 configured to clear the configured uplink grant. The field of the resource allocation information included in the uplink grant that is used to indicate the release of the Semi-Persistent Scheduling is set to a prescribed value defined for the release of the Semi-Persistent Scheduling.

The base station device 3 according to the present embodiment includes the higher layer processing unit 301 configured to consider that the uplink grant transmitted to the terminal device 1 is to be stored as a configured uplink grant, a reception unit 305 configured to perform the reception of the MAC protocol data unit, based on the configured uplink grant that is considered to occur in a subframe satisfying a prescribed condition, the reception unit 305 receiving the MAC protocol data unit, based on the configured uplink grant in response to transmitting the uplink grant that is used to indicate a release of the Semi-Persistent Scheduling, and the higher layer processing unit 301 configured to consider the configured uplink grant to be cleared. The field of the resource allocation information included in the uplink grant that is used to indicate the release of the Semi-Persistent Scheduling is set to a prescribed value defined for the release of the Semi-Persistent Scheduling.

The terminal device 1 according to the present embodiment includes the reception unit 105 configured to receive a first parameter for indicating the number of empty transmissions before a release, and a second parameter for configuring the first counter, the higher layer processing unit 101 which is configured with the first parameter, and configured to clear the configured uplink grant in the case that the number of consecutive empty transmissions based on the configured uplink grant reaches a value indicated using the first parameter, and the higher layer processing unit 101 being configured with the second parameter, and to clear the configured uplink grant in the case that the number of occurrences of the configured uplink grant reaches the value indicated using the second parameter. Each of the consecutive empty transmissions corresponds to an initial transmission, and is the transmission of the MAC protocol data unit not including first prescribed information.

The terminal device 1 according to the present embodiment includes the higher layer processing unit 101 configured to receive a first parameter for indicating the number of empty transmissions before a release and a second parameter for configuring the first timer, is configured with the first parameter, and configured to clear the configured uplink grant in the case that the number of consecutive empty transmissions based on the configured uplink grant reaches the value indicated using the first parameter, and the higher layer processing unit 101 being configured with the second parameter, and clears the configured uplink grant in the case that a timer indicated using the second parameter has expired. Each of the consecutive empty transmissions corresponds to an initial transmission, and is the transmission of the MAC protocol data unit not including the first prescribed information.

The base station device 3 according to the present embodiment includes the transmission unit 307 configured to transmit a first parameter for indicating the number of empty transmissions before a release, and a second parameter for configuring a first counter, and the higher layer processing unit 301 which configures a first parameter, and configured to consider that the configured uplink grant is to be cleared in the case that the number of consecutive empty transmissions based on the configured uplink grant reaches a value indicated using the first parameter, the higher layer processing unit 301 configuring a second parameter, and considering that the configured uplink grant is to be cleared in a case that the number of occurrences of the configured uplink grant reaches a value indicated using the second parameter. Each of the consecutive empty transmissions corresponds to an initial transmission, and is transmission of the MAC protocol data unit not including the first prescribed information.

The base station device 3 according to the present embodiment includes the transmission unit 307 configured to transmit a first parameter for indicating the number of empty transmissions before a release, and a second parameter for configuring a first timer, and the higher layer processing unit 301 which configures the first parameter, and considers that the configured uplink grant is to be cleared in the case that the number of consecutive empty transmissions based on the configured uplink grant reaches a value indicated using the first parameter, the higher layer processing unit 301 configuring the second parameter, and considering that the configured uplink grant is to be cleared in a case that a timer indicated using a second parameter has expired. Each of the consecutive empty transmissions corresponds to an initial transmission, and is transmission of the MAC protocol data unit not including the first prescribed information.

The terminal device 1 according to the present embodiment includes the higher layer processing unit 101 configured to store the uplink grant received from a base station device, as the configured uplink grant, and the transmission unit 107 configured to transmit the MAC protocol data unit including prescribed information based on the configured uplink grant considered to occur in a subframe satisfying a prescribed condition, while the timer is not running, the transmission unit 107 not transmitting the MAC protocol data unit based on the configured uplink grant considered to occur in the subframe satisfying the prescribed condition while the timer is running regardless of whether the prescribed information is included in the MAC protocol data unit. The timer is started, based on the transmission of the MAC protocol data unit including the prescribed information.

The transmission unit 107 is configured to transmit the MAC protocol data unit based on the configured uplink grant in response to the uplink grant that is used to indicate activation or reactivation of the Semi-Persistent Scheduling regardless of whether the timer is running or whether the prescribed information is included in the MAC protocol data unit.

The transmission unit 107 is configured to transmit the MAC protocol data unit based on the configured uplink grant in response to the uplink grant that is used to indicate a release of the Semi-Persistent Scheduling regardless of whether the timer is running or whether the prescribed information is included in the MAC protocol data unit, and the higher layer processing unit 101 is configured to stop the timer.

The base station device 3 according to the present embodiment includes the higher layer processing unit 301 configured to consider an uplink grant transmitted to the terminal device to be stored as the configured uplink grant, and the reception unit 305 configured to receive the MAC protocol data unit including prescribed information based on the configured uplink grant considered to occur in a subframe satisfying a prescribed condition, while the timer is not running, the reception unit 305 not receiving the MAC protocol data unit based on the configured uplink grant considered to occur in the subframe satisfying the prescribed condition while the timer is running regardless of whether the prescribed information is included in the MAC protocol data unit. The timer is started, based on the reception of the MAC protocol data unit including the prescribed information.

The reception unit 305 is configured to receive the MAC protocol data unit based on the configured uplink grant in response to transmitting the uplink grant that is used to indicate activation or reactivation of the Semi-Persistent Scheduling regardless of whether the timer is running or whether the prescribed information is included in the MAC protocol data unit.

The reception unit 305 is configured to receive the MAC protocol data unit based on the configured uplink grant in response to transmitting the uplink grant that is used to indicate a release of the Semi-Persistent Scheduling regardless of whether the timer is running or whether the prescribed information is included in the MAC protocol data unit, and the higher layer processing unit 301 is configured to stop the timer.

The terminal device 1 according to the present embodiment includes the reception unit 105 configured to receive parameters for configuring the master cell group and secondary cell group, a parameter for configuring the Timing Advance Groups, and a parameter for configuring the timer for each of the Timing Advance Groups, and the higher layer processing unit 101 configured to store the uplink grant received in the primary secondary cell of the secondary cell group as the configured uplink grant, the higher layer processing unit 101 considering that the timer for the Primary Secondary Timing Advance Group of the secondary cell group has expired and clearing the configured uplink grant, in a case that the difference between the uplink transmission timing for the Primary Timing Advance Group of the master cell group and the uplink transmission timing for the Primary Secondary Timing Advance Group of the secondary cell group exceeds a maximum transmission timing difference.

The terminal device 1 also includes the transmission unit 107 configured to consider that the timer for the Secondary Timing Advance Group of the master cell group has expired, and to stop the transmission on the PUSCH, PUCCH, and/or SRS for the Secondary Timing Advance Group of the master cell group, in a case that the difference between the uplink transmission timing for the Primary Timing Advance Group of the master cell group and the uplink transmission timing for the Secondary Timing Advance Group of the master cell group exceeds the maximum transmission timing difference.

The terminal device 1 also includes the transmission unit 107 configured to consider that the timer for the Secondary Timing Advance Group of the secondary cell group has expired, and to stop the transmission on the PUSCH, PUCCH, and/or SRS for the Secondary Timing Advance Group of the secondary cell group, in the case that the difference between the uplink transmission timing for the Primary Timing Advance Group of the master cell group and the uplink transmission timing for the Secondary Timing Advance Group of the secondary cell group exceeds the maximum transmission timing difference.

The base station device 3 according to the present embodiment includes the transmission unit 307 configured to transmit the parameters for configuring the master cell group and secondary cell group, the parameter for configuring the Timing Advance Groups, and the parameter for configuring the timer for each of the Timing Advance Groups, and the higher layer processing unit 301 configured to consider that the uplink grant transmitted in the primary secondary cell of the secondary cell group is to be stored as the configured uplink grant, the higher layer processing unit 301 considering that the timer for the Primary Secondary Timing Advance Group of the secondary cell group has expired and considering that the configured uplink grant is to be cleared, in the case that the difference between the uplink transmission timing for the Primary Timing Advance Group of the master cell group and the uplink transmission timing for the Primary Secondary Timing Advance Group of the secondary cell group exceeds the maximum transmission timing difference.

The base station device 3 also includes the higher layer processing unit 301 configured to consider that the timer for the Secondary Timing Advance Group of the master cell group has expired, and to consider that the transmission on the PUSCH, PUCCH, and/or SRS for the Secondary Timing Advance Group of the master cell group is to be stopped, in the case that the difference between the uplink transmission timing for the Primary Timing Advance Group of the master cell group and the uplink transmission timing for the Secondary Timing Advance Group of the master cell group exceeds the maximum transmission timing difference.

The base station device 3 also includes the higher layer processing unit 301 configured to consider that the timer for the Secondary Timing Advance Group of the secondary cell group has expired, and to consider the transmission on the PUSCH, PUCCH, and/or SRS for the Secondary Timing Advance Group of the secondary cell group to be stopped, in the case that the difference between the uplink transmission timing for the Primary Timing Advance Group of the master cell group and the uplink transmission timing for the Secondary Timing Advance Group of the secondary cell group exceeds the maximum transmission timing difference.

This allows the uplink data to be efficiently transmitted.

A program running on each of the base station device 3 and the terminal device 1 according to the present invention may serve as a program that controls a Central Processing Unit (CPU) and the like (a program for causing a computer to operate) in such a manner as to enable the functionalities according to the above-described embodiment of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiment is achieved as an aggregation (a device group) including multiple devices. Devices constituting such a device group may be each equipped with some or all portions of each function or each functional block of the base station device 3 according to the above-described embodiment. The device group may include at least general functionalities or general functional blocks of the base station device 3. Furthermore, the terminal device 1 according to the above-described embodiments can also communicate with the base station device as the aggregation.

Furthermore, the base station device 3 according to the above-described embodiment may serve as an Evolved Universal Terrestrial Radio Access Network (EUTRAN). Furthermore, the base station device 3 according to the above-described embodiment may have some or all portions of the functionalities of a node higher than an eNodeB.

Furthermore, some or all portions of each of the terminal device 1 and the base station device 3 according to the above-described embodiment may be achieved as an LSI which is a typical integrated circuit or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal device has been described as an example of a communication device, but the present invention is not limited to such a terminal device, and is applicable to a terminal device or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

Embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

REFERENCE SIGNS LIST 1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 SPS control unit
3011 Radio resource control unit
3013 Scheduling unit
3015 SPS control unit

The invention claimed is:

1. A terminal apparatus comprising:
receiving circuitry that receives, from a base station apparatus, an uplink grant on a physical downlink control channel and a Radio Resource Control (RRC) message including a parameter configuring not to perform an uplink transmission;
higher layer processing circuitry that generates a Medium Access Control Protocol Data Unit (MAC PDU) that includes a Buffer Status Report (BSR); and
transmitting circuitry that transmits the MAC PDU to the base station apparatus based on the uplink grant; wherein
the higher layer processing circuitry determines not to generate the MAC PDU in a case that the parameter is configured, the MAC PDU is to include only a periodic BSR, and there is no available data for an uplink transmission, and the higher layer processing circuitry determines not to generate the MAC PDU in a case that the parameter is configured and the MAC PDU is to include only a padding BSR.

2. A base station apparatus comprising:
transmitting circuitry that transmits, to a terminal apparatus, an uplink grant on a physical downlink control channel and a Radio Resource Control (RRC) message including a parameter configuring not to perform an uplink transmission;
receiving circuitry that receives, from the terminal apparatus, a Medium Access Control Protocol Data Unit (MAC PDU) that includes a Buffer Status Report (BSR), the MAC PDU being transmitted based on the uplink grant; and
higher layer processing circuitry that determines that the MAC PDU is not generated by the terminal apparatus in a case that the parameter is configured, the MAC PDU is to include only a periodic BSR, and there is no available data for an uplink transmission in the terminal apparatus, wherein
the higher layer processing circuitry determines that the MAC PDU is not generated by the terminal apparatus in a case that the parameter is configured and the MAC PDU is to include only a padding BSR.

3. A communication method of a terminal apparatus comprising:
receiving, from a base station apparatus, an uplink grant on a physical downlink control channel and a Radio Resource Control (RRC) message including a parameter configuring not to perform an uplink transmission;
generating a Medium Access Control Protocol Data Unit (MAC PDU) that includes a Buffer Status Report (BSR);
transmitting the MAC PDU to the base station apparatus based on the uplink grant;
determining not to generate the MAC PDU in a case that the parameter is configured, the MAC PDU is to include only a periodic BSR, and there is no available data for an uplink transmission; and
determining not to generate the MAC PDU in a case that the parameter is configured and the MAC PDU is to include only a padding BSR.

4. A communication method of a base station apparatus comprising:
transmitting, to a terminal apparatus, an uplink grant on a physical downlink control channel and a Radio Resource Control (RRC) message including a parameter configuring not to perform an uplink transmission;
receiving, from the terminal apparatus, a Medium Access Control Protocol Data Unit (MAC PDU) that includes a Buffer Status Report (BSR), the MAC PDU being transmitted based on the uplink grant;
determining that the MAC PDU is not generated by the terminal apparatus in a case that the parameter is configured, the MAC PDU is to include only a periodic BSR, and there is no available data for an uplink transmission in the terminal apparatus, and
determining that the MAC PDU is not generated by the terminal apparatus in a case that the parameter is configured and the MAC PDU is to include only a padding BSR.

* * * * *